US010063465B2

(12) United States Patent
Maruyama et al.

(10) Patent No.: US 10,063,465 B2
(45) Date of Patent: Aug. 28, 2018

(54) NETWORK SYSTEM AND RELAY DEVICE

(71) Applicant: Hitachi, Ltd., Chiyoda-ku, Tokyo (JP)

(72) Inventors: Tatsuya Maruyama, Tokyo (JP);
Tsutomu Yamada, Tokyo (JP);
Chikashi Komatsu, Tokyo (JP);
Mitsuyasu Kido, Tokyo (JP); Shouji Yoshida, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 158 days.

(21) Appl. No.: 15/033,670

(22) PCT Filed: Sep. 5, 2014

(86) PCT No.: PCT/JP2014/073430
§ 371 (c)(1),
(2) Date: May 2, 2016

(87) PCT Pub. No.: WO2015/079765
PCT Pub. Date: Jun. 4, 2015

(65) Prior Publication Data
US 2016/0277288 A1 Sep. 22, 2016

(30) Foreign Application Priority Data
Nov. 26, 2013 (JP) .................................. 2013-243456

(51) Int. Cl.
*H04L 12/721* (2013.01)
*H04L 12/437* (2006.01)
(Continued)

(52) U.S. Cl.
CPC ............ *H04L 45/34* (2013.01); *H04L 12/422* (2013.01); *H04L 12/437* (2013.01); *H04L 45/28* (2013.01); *H04L 47/31* (2013.01)

(58) Field of Classification Search
CPC ..... H04L 45/34; H04L 12/422; H04L 12/437; H04L 45/28; H04L 47/31; H04L 12/801;
(Continued)

(56) References Cited

U.S. PATENT DOCUMENTS

2013/0198291 A1* 8/2013 Wang .................. H04L 65/4061
709/205
2015/0003241 A1* 1/2015 Rhee ....................... H04L 47/13
370/230
2015/0295635 A1* 10/2015 Koskiahde .......... H04L 12/2863
370/315

FOREIGN PATENT DOCUMENTS

JP          2009-10494 A      1/2009
JP          2013-207447 A    10/2013

OTHER PUBLICATIONS

Kirrmann, H., "HSR-High Availability Seamless Redundancy", IEC 62439-3, 2012, URL:http//lamspeople.epfl.ch/kirrmann/Pubs/IEC_62439/IEC_61439-3/IEC_62439-3.5_HSR_Kirrmann.ppt. pp. 1-43 (44 pages).

(Continued)

*Primary Examiner* — Kwang B Yao
*Assistant Examiner* — Hardikkumar Patel
(74) *Attorney, Agent, or Firm* — Crowell & Moring LLP

(57) ABSTRACT

An object of the present invention is to provide a network system or the like in which the construction cost of a network for a plurality of control systems is suppressed which is excellent in resistance to a network failure. In order to solve the problems, according to the present invention, there is provided a network system including a plurality of communication devices that are disposed in a plurality of bases, and are grouped into predetermined control systems for each of the devices which transmit and receive packets to and from each other so as to monitor or control target equipment, and a plurality of relay devices each of which
(Continued)

includes a plurality of communication ports and transmits a packet transmitted by the communication device to another communication device, in which a plurality of communication devices disposed in each base are connected in parallel between the two relay devices, the relay devices disposed in different bases are connected to each other in a ring shape via a network, and a plurality of communication devices disposed in at least one base include communication devices belonging to different control systems.

10 Claims, 26 Drawing Sheets

(51) Int. Cl.
*H04L 12/42* (2006.01)
*H04L 12/703* (2013.01)
*H04L 12/833* (2013.01)

(58) Field of Classification Search
CPC ....... H04L 12/823; H04L 47/13; H04L 47/32; H04L 12/42; H04L 12/40176; H04L 12/703; H04L 12/2863; H04B 7/155; H04B 7/15542
See application file for complete search history.

(56) References Cited

OTHER PUBLICATIONS

International Search Report (PCT/ISA/210) issued in PCT Application No. PCT/JP2014/073430 dated Oct. 21, 2014 with English translation (3 pages).
Japanese-language Written Opinion (PCT/ISA/237) issued in PCT Application No. PCT/JP2014/073430 dated Oct. 21, 2014 (3 pages).

* cited by examiner

FIG. 11

| SYSTEM IDENTIFIER | IMPORTANCE |
|---|---|
| 1 | 1 |
| 2 | 2 |
| 3 | 3 |

NETWORK SYSTEM AND RELAY DEVICE

TECHNICAL FIELD

The present invention relates to a network system and a relay device.

BACKGROUND ART

A network constituting a control system may be made to be redundant in order to achieve high reliability, and, as a redundancy method using a ring network, there are methods called High availability Seamless Redundancy (HSR) and Parallel Redundancy Protocol (PRP) in IEC 62439-3. As an example using the HSR method, NPL 1 discloses that a transmission device transmits identical frames from ports clockwise and counterclockwise in a ring network, and the identical frames are transmitted to a reception device via clockwise and counterclockwise paths of the ring. Consequently, even if a failure occurs in a part of the network, the reception device can receive the frame without any loss via a route not including the failure location.

CITATION LIST

Non-Patent Literature

NPL 1: Prof. Dr. Hubert Kirrmann, "HSR—High Availability Seamless Redundancy", [online], [Searched Nov. 18, 2013], the Internet <URL:http://lamspeople.epfl.ch/kirrmann/Pubs/IEC_62439/IEC_61439-3/IEC_62439-3.5_HSR_Kirrmann.ppt>

SUMMARY OF INVENTION

Technical Problem

In HSR of IEC 62439-3, bidirectional paths of the ring network are used at all times, and thus use efficiency of a communication bandwidth is lowered, but there is an advantage in that no time is required for recovery from a failure. For this reason, HSR is suitable for an industrial control system in which early spreading of the failure is required.

Here, for example, in a control system including a protection control device of a power system, a single control system may be constituted of protection control devices present in other bases. In a case where there are a plurality of such control systems, if a ring network is constructed for each control system, there is a problem in that the cost for constructing the network increases. On the other hand, if a plurality of control systems are constructed on a single ring network, construction cost is reduced, but there is a problem in that there is a high probability that a network failure in a control system may influence communication of other control systems.

An object of the invention is to provide a network system or the like in which construction cost of a network for a plurality of control systems is suppressed which is excellent in resistance to a network failure.

Solution to Problem

In order to solve the problems, according to the invention, there is provided a network system including a plurality of communication devices that transmit and receive packets; a plurality of relay devices each of which includes a plurality of communication ports and transmits a packet transmitted by the communication device to another communication device; and a network that connects the plurality of communication devices to the plurality of relay devices in a ring shape, in which the plurality of relay devices include a first relay device provided with a plurality of A system communication ports receiving a packet from an A system direction of the ring-shaped network, and a second relay device provided with a plurality of B system communication ports receiving a packet from a B system direction opposite to the A system direction, in which the respective A system communication ports of the first relay device are connected to the respective B system communication ports of the second relay device via the communication device, and in which, if a packet is received by the B system communication port, the first relay device selects a transmission destination communication port from among the plurality of A system communication ports according to a predetermined rule, and transmits the received packet to any one of the communication devices by using the selected communication port.

Advantageous Effects of Invention

According to the present invention, it is possible to provide a network system or the like in which construction cost of a network for a plurality of control systems is suppressed which is excellent in resistance to a network failure. Consequently, it is possible to construct a highly reliable control network with a reduced number of wirings.

Problems, configurations, and effects other than the above description will become apparent through description of the following embodiments.

BRIEF DESCRIPTION OF DRAWINGS

FIG. 11 is a diagram illustrating correspondence between a system identifier and importance.

DESCRIPTION OF EMBODIMENTS

First, with reference to the drawings, a description will be made of a ring network in HSR, and a problem in a case where a plurality of different control systems are incorporated into the ring network.

Figure 26:
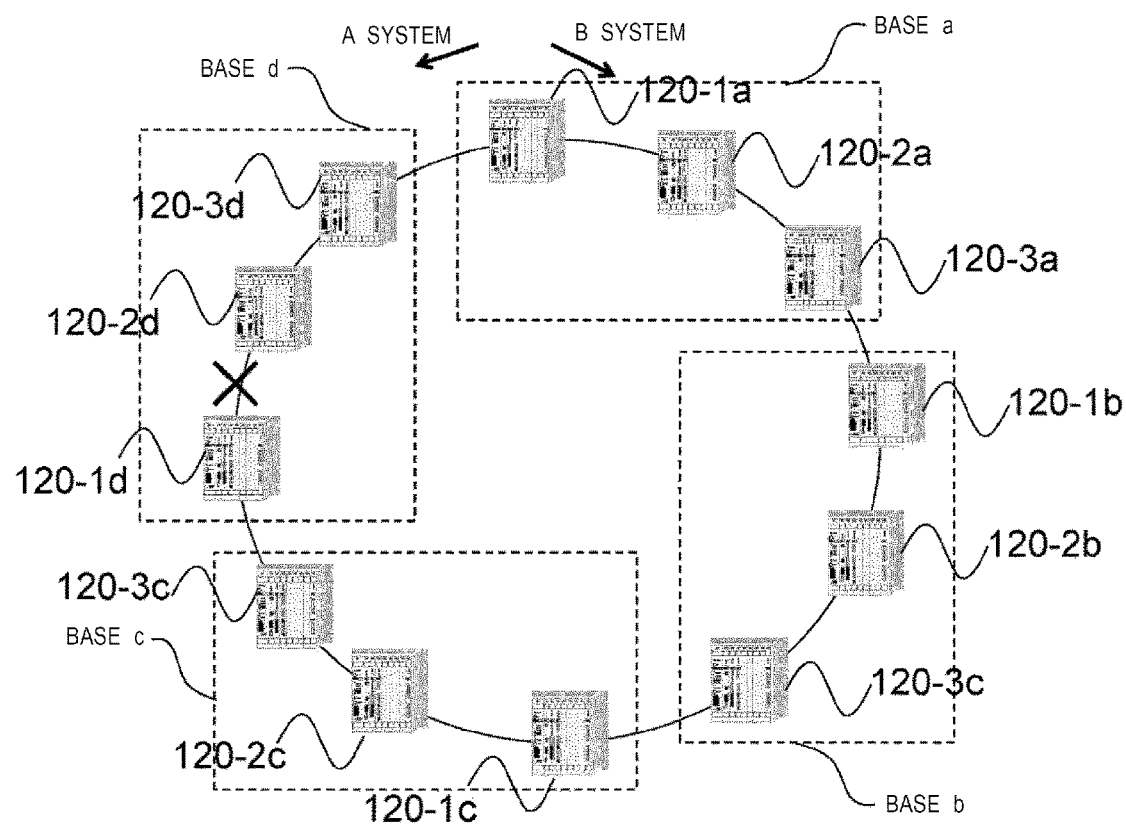
FIG. 26 is a system configuration diagram using one embodiment of the invention.

FIG. 26 illustrates an example in which communication devices of different control systems are connected in series to each other in the same ring-shaped network. Bases a, b, c and d located at positions far away from each other are respectively provided with communication devices 120-1a to 120-3a, communication devices 120-1b to 120-3b, communication devices 120-1c to 120-3c, and communication devices 120-1d to 120-3d, which are network connected to each other in a ring shape.

The communication devices 120-1a, 120-1b, 120-1c and 120-1d constitute a single control system, and transmit and receive communication data therebetween so as to perform monitoring control on control targets (not illustrated) connected to the communication devices 120. Similarly, a single control system is constituted of each of a group of the communication devices 120 including the communication devices 120-2a, 120-2b, 120-2c and 120-2d, a group of the communication devices 120 including the communication devices 120-3a, 120-3b, 120-3c and 120-3d, and a group of communication devices 120 including communication devices 120-4a, 120-4b, 120-4c and 120-4d.

In HSR, each communication device 120 transmits identical packets in a clockwise direction (B system) and a counterclockwise direction (A system) of the ring network so as to perform communication. For this reason, since bidirectional paths of the ring network are used at all times, even if a failure occurs in a part of the network, the packets can be transmitted and received via a route not including the failure location. Hereinafter, for convenience of description, the clockwise direction of the ring network is referred to as a B system, and the counterclockwise direction is referred to as an A system.

For example, it is assumed that, in a case where a packet is transmitted from the communication device 120-1a to the communication device 120-1d, a failure occurs in the network between the communication device 120-1d and the communication device 120-2d. Thus, a packet transmitted in the A system direction cannot reach the communication device 120-1d. On the other hand, since the communication device 120-1a also transmits the same packet in the B system direction, the packet transmitted in the B system direction can reach the communication device 120-1d.

As mentioned above, in the ring network of HSR, even if a failure occurs in a part of the network, communication can be continued without requiring time for failure recovery.

On the other hand, if a plurality of control systems as illustrated in FIG. 26 are integrated into a single ring network and are constructed, the number of communication devices 120 constituting the ring network thus increases. For this reason, a probability of the occurrence of failures increases to N times the number of included control systems. If abnormalities occur in two or more locations, there is a problem in that communication of all control systems included in the ring network stops. For example, in the above-described example, in a case where the communication device 120-3c fails in addition to the network failure between the communication device 120-1d and the communication device 120-2d, communication between the communication device 120-1a and the communication device 120-1d cannot be performed. Next, a description will be made of an example of a ring network which suppresses propagation of a communication failure.

Figure 27:
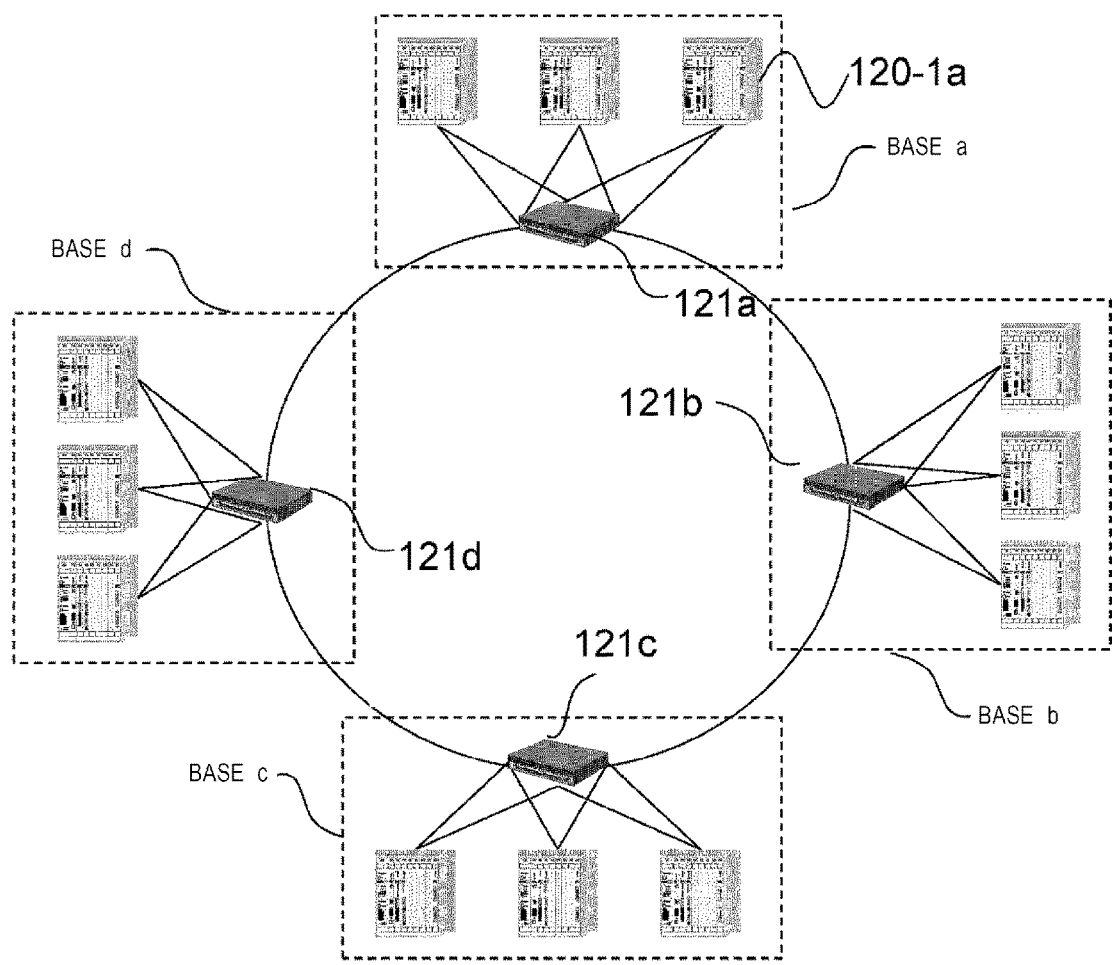
FIG. 27 is a system configuration diagram using one embodiment of the invention.

FIG. 27 illustrates an example of a network system in which communication devices 120 of each control system are connected to each other and are multiplexed by using a single network relay device 121. The network relay device 121a, the network relay device 121b, the network relay device 121c, and the network relay device 121d are respectively connected to communication devices 120 provided in bases a, b, c and d via switches, and a ring network is configured by connecting the network relay devices 121a to 121d to each other.

In this system, since each communication device 120 does not relay a packet transmitted over the ring network, for example, even if the communication device 120-1a fails, other control systems can continuously perform communication.

On the other hand, in this system, communication may not be continuously performed if the network relay device 121 fails. In other words, there is a problem in that the system stops due to a single failure.

Example 1

In the present example, with reference to the drawings, a description will be made of a network system in which a reduction in resistance to a network failure is suppressed, and a plurality of control systems are constructed in a ring network.

(System Example)

Figure 1:
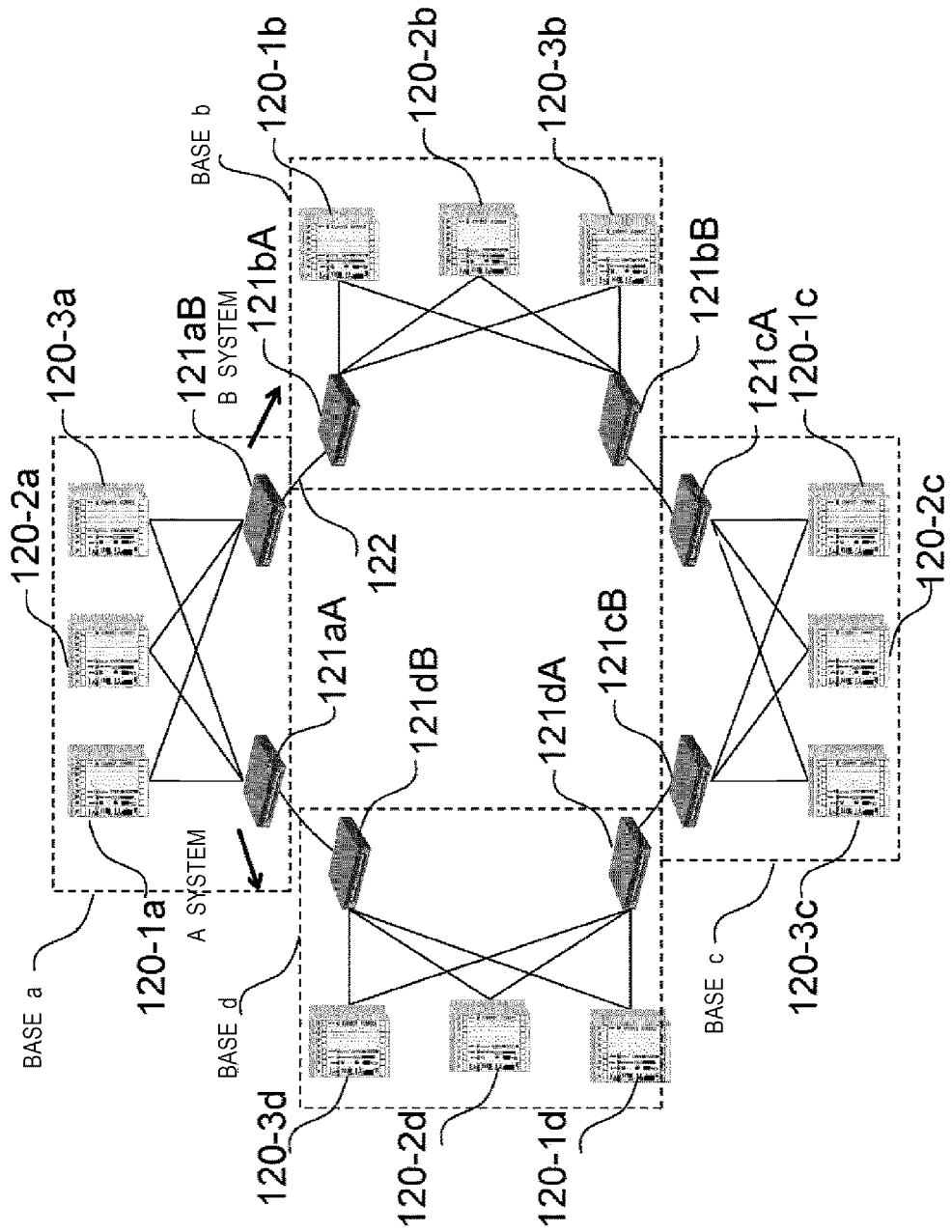
FIG. 1 is a system configuration diagram using one embodiment of the invention.

FIG. 1 is a diagram illustrating a configuration example of a network system in Example 1. In the network system of the present example, a ring-shaped network is constructed by a plurality of communication devices 120 which are provided in respective bases a, b, c and d and are connected to control devices (not illustrated); a plurality of network relay devices 121 which interpose the communication devices 120 provided in the bases a, b, c and d and connect the communication devices 120 in the respective bases in parallel to each other; and networks 122 which connect the network relay devices 121 to each other and connect the network relay devices 121 to the communication devices 120. In other words, in the base a, the communication device 120-1a, the communication device 120-2a, and the communication device 120-3a are connected in parallel to each other in the B system direction of the network relay device 121aA, and the network relay device 121aB is connected in the B system direction of the communication devices 120. Also in the other bases b to d, the network relay devices 121 are similarly connected to the communication devices 120, and a ring-shaped network is constructed by connecting the network relay devices of the respective bases to each other.

Effects of the invention will be described by exemplifying an HSR node (Double attached node implementing HSR: DANH) defined in IEC 62439-3 as the communication device 120.

The communication device 120 is a device corresponding to HSR, and transmits and receives communication packets to and from other communication devices 120 so as to perform transmission of control command values, acquisition of measurement values, or various setting.

In the present example, as an example, a description will be made of a case where the communication device 120 is a protection control device of a power system. The protection control device is a device which acquires current or voltage data from the power system (not illustrated) so as to detect an abnormality of the power system, and protects the system. The protection control device provided in a certain base transmits and receives sampling data of a current or a voltage in the base, control commands, and state signals to and from a protection control device of the same system provided in another base. In this case, data in the same control system may be stored in a packet. There may be a configuration in which the communication device 120 has only a communication function, and thus protection control devices are connected to each other.

As in FIG. 1, the communication devices 120-1a, 120-1b and 120-1c belonging to different control systems are provided in the base a. The communication devices are provided in the same substation, or may be provided in areas which are slightly distant from each other.

In the present example, the communication devices 120-1a, 120-1b, 120-1c and 120-1d constitute a single control system, and transmit and receive packets to and from each other so as to perform protection control calculation. Similarly, a single control system is constituted of each of a group of the communication devices 120 including the communication devices 120-2a, 120-2b, 120-2c and 120-2d, a group of the communication devices 120 including the communication devices 120-3a, 120-3b, 120-3c and 120-3d, and a group of the communication devices 120 including the communication devices 120-4a, 120-4b, 120-4c and 120-4d.

Each communication device 120 transmits packets carrying the same information in both of the A system direction and the B system direction of the network during transmission. During reception, a packet received first is captured, and, in a case where the same packet is received thereafter, the packet is discarded. In the above-described way, communication paths can be multiplexed, and a packet can be prevented from being continuously circulated over the network.

The network relay device 121 is a relay device in the network 122, and controls a path of a packet transmitted to the communication device 120 or the network relay device 121 so as to transmit the packet. Examples of the network relay device 121 include various network relay devices such as a network switch including an L2 switch and an L3 switch, a bridge, a router, Transparent Clock (TC) or Boundary Clock (BC) in IEEE 1588, and an OpenFlow switch.

The network 122 is a network connecting the communication devices 120 and the network relay devices 121, and includes various industrial networks such as control networks defined in IEEE 802.3 (Ethernet), IEC 61784, and IEC 61158.

In the control system constituted of the protection control device as in the present example, a distance between the network relay devices 121 is several tens of kilometers. For this reason, if network systems are separately configured, the cost for constructing the networks considerably increases. In the present example, the communication devices 120 present in the same base are connected in parallel to each other between two network relay devices 121. Since the different bases are connected to each other via the network relay devices, the number of lines can be considerably reduced, and thus it is possible to minimize cost for constructing the networks. As described above, in the present network system, since each communication device 120 transmits identical packets in the A system direction and the B system direction, the packet can be made to arrive via a route not including an abnormality location even if an abnormality occurs in a part of the network. Even in a case where any one of the communication devices 120 fails, since the communication device 120 is connected in parallel to the communication devices 120 belonging to other control systems, the abnormality does not spread, and the other control systems can continuously perform communication.

In FIG. 1, three communication devices 120 are connected between the network relay devices 121, but the number thereof may be different, and the number of communication devices 120 between the communication devices 120 may be different. For example, a single communication device 120 is connected between a network relay device 121a and a network relay device 121h, and four communication devices may be connected between a network relay device 121b and a network relay device 121c.

(Hardware Configuration)

Figure 2:
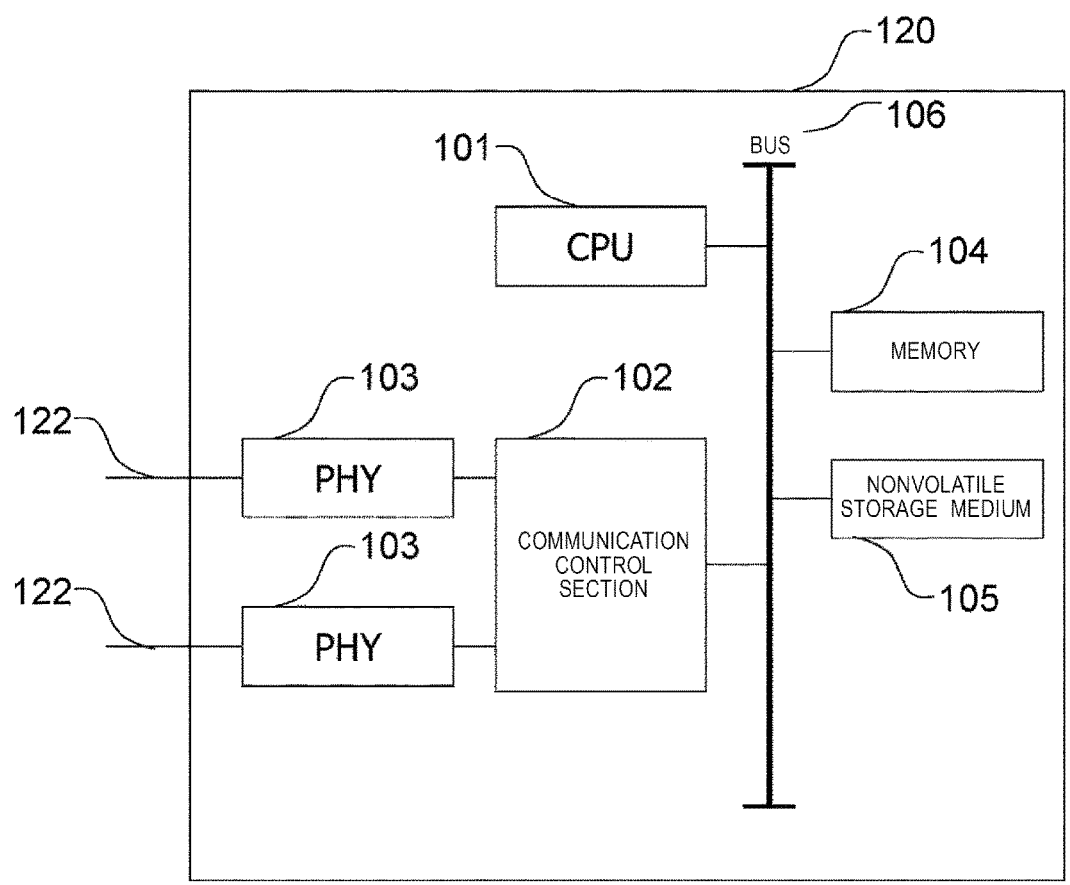
FIG. 2 is a hardware configuration diagram in one embodiment of the invention.

FIG. 2 illustrates a hardware configuration of the communication device 120.

A CPU 101 transmits a program from a nonvolatile storage medium 109 to a memory 108 and executes the program. An execution processing program includes, for example, an operating system (hereinafter, referred to as an OS) or an application program which operates on the OS so as to perform protection control calculation of the power system. The program operating on the CPU 101 sets an operation of a communication control section 111 or acquires state information.

The communication control section 102 is an IC providing a communication function of HSR of IEC 62439-3, and is constituted of, for example, a field-programmable gate array (FPGA).

A PHY 103 is a transceiver IC having a function of performing communication with the control network 122. A physical layer (PHY) chip in IEEE 802.3 is exemplified as a communication standard providing the PHY 103. Each of two PHYs 103 is connected to different network relay devices 121. In other words, in a case of the communication device 120-1a, the communication device is connected to the network relay devices 121aA and 121aB. In the configuration illustrated in FIG. 2, since the PHY 103 is connected to the communication control section 102, a process regarding a media access control (MAC) layer in IEEE 802.3 is performed by the communication control section 102. However, effects of the invention are still achieved even in a configuration in which an IC providing the MAC function is disposed between the communication control section 102 and the PHY 103, or a configuration in which a communication IC in which the IC providing the MAC function is combined with the PHY 103 is connected to the communication control section 102. The PHY 103 may be included in the communication control section 102.

The memory 104 is a temporary storage region used for an operation of the CPU 101, and stores the OS, an application program, and the like transmitted from the nonvolatile storage medium 105. In the configuration illustrated in FIG. 2, two PHYs 103 are illustrated, but the number of PHYs 103 is the same as the number of communication ports corresponding to the communication control section 102.

The nonvolatile storage medium 105 is an information storage medium, and is used to preserve the OS, an application, a device driver, and a program for operating the CPU 101, and to preserve results of executing the program. As the nonvolatile storage medium 105, a hard disk drive (HDD), a solid state drive (SSD), or a flash memory is exemplified. As an external storage medium which is easily detached, for example, a floppy disk (FD), a CD, a DVD, a Blu-ray (registered trademark) disc, a USB memory, or a Compact Flash card may be used.

A bus 106 connects the CPU 101, the communication control section 102, the memory 104, and the nonvolatile storage medium 105 to each other. As the bus 106, a PCI bus, an ISA bus, a PCI Express bus, a system bus, a memory bus, and the like are exemplified.

(Configuration of HSR Functional Block)

Figure 3:
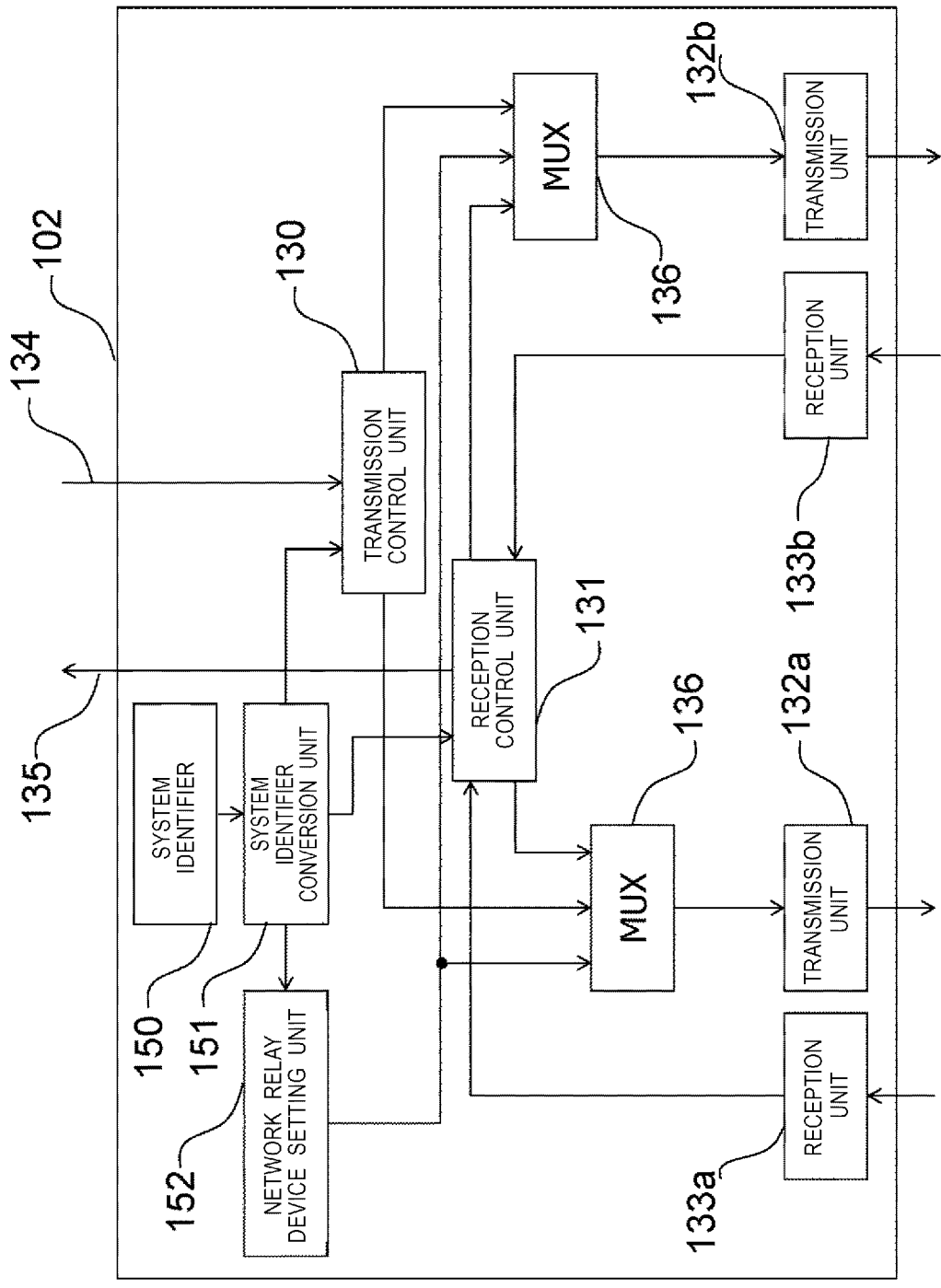
FIG. 3 is a functional configuration diagram in one embodiment of the invention.

FIG. 3 illustrates a functional configuration of the communication control section 102.

A system identifier 150 is an identifier of a control system to which the communication device 120 belongs, and is defined when the network is constructed.

A system identifier conversion unit 151 converts the system identifier 150 into an identifier on a network protocol. Consequently, the system identifier 150 may be used to set information indicating the type, such as a number or a character string, and may be converted into a VID of a VLAN which will be described later, a path identifier (PathId) of an HSR tag, and a unicast address, a multicast address, and a broadcast address of protocol addresses (an IP address, a MAC address in IEEE 802.3, and the like) by the system identifier conversion unit 151.

A network relay device setting unit 152 sets logical network construction of the network relay devices by using the identifier on the network protocol created by the system identifier conversion unit 151.

Operations of the system identifier 150, the system identifier conversion unit 151, and the network relay device setting unit 152 will be described later.

A transmission control unit 130 processes data or a packet which is sent via a bus 134, and transmits a processed result to either or both of a transmission unit 132*a* and a transmission unit 132*b*. The processing process in the transmission unit 130 may include, for example, processes for generating a frame from the data, duplicating the data or the packet, adding a predetermined tag, and computing and adding abnormality diagnosis data such as CRC.

As a tag added by the transmission unit 130, an HSR tag or a PRP tag defined in IEC 62439-3 is exemplified.

A reception control unit 131 processes data received from a reception unit 133*a* and a reception unit 133*b*, and transmits a processed result to a bus 135 or the transmission unit 132*a* and the transmission unit 132*b* according to a predetermined rule. The processing process in the reception control unit 131 may include, for example, removing the tag added to the packet or extracting data.

A rule for the reception control unit 131 to transmit a packet may be based on, for example, a destination address added to the packet, a transmission source address, the packet type, a VLAN group defined in IEEE 802.1Q, the priority, and a sequence number. An address system may include, for example, a MAC address and an IP address in IEEE 802.3. For example, in HSR in IEC 62439-3, if a packet discriminated by a transmission source MAC address and a sequence number of the packet received from the reception unit 133*a* is received first, the packet is transmitted to the transmission unit 132*b*, and if the packet is received second or later, the packet is discarded. In a case where a destination address of a packet is a multicast or broadcast address, the packet may be transmitted not only to other communication ports but also to the bus 135.

The reception control unit 131 includes information storage means for storing information regarding a processed packet for a predetermined period, and stores information (for example, a transmission source address and a sequence number) regarding the processed packet.

The transmission unit 132 is a functional unit which is connected to the PHY 103 and transmits a packet and data to the PHY 103. As described in the PHY 103, the transmission unit 132 may have, for example, a MAC function.

The reception unit 133 is a functional unit which is connected to the PHY 103 and receives a packet and data from the PHY 103. As described in the PHY 103, the reception unit 133 may have, for example, a MAC function.

The bus 134 is connected to the bus 106, and receives data from the bus 106. The bus 135 is connected to the bus 106, and transmits data to the bus 106. The bus 134 and the bus 135 are separately described, but this is for indicating a flow of logical data, and the buses are physically the same as the bus 106. For example, there may be provided a function in which the transmission unit 130 and the reception unit 131 are connected to the bus 106.

A multiplexer (MUX) 136 has a function of generating one data item output from a plurality of data inputs, and may select one input from among a plurality of inputs, or may combine or multiplex the inputs.

Figure 4:
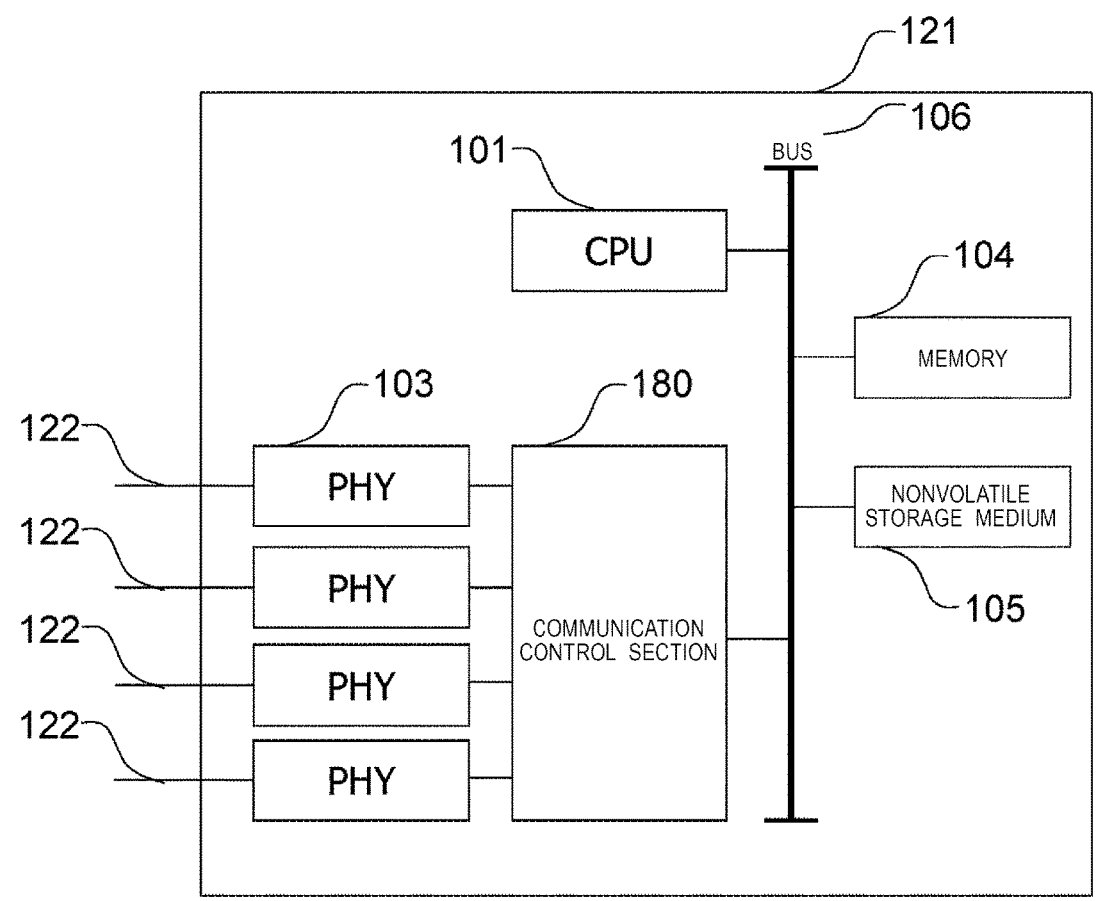
FIG. 4 is a functional configuration diagram in one embodiment of the invention.

FIG. 4 is a diagram illustrating a configuration of the network relay device 121. Constituent elements having the same function as that of the constituent elements of the communication device 120 illustrated in FIG. 2 are given the same reference numeral. A difference from the communication device 120 is that four communication ports and a communication control section 180 are provided.

The communication control section 180 has a transmission function in the network relay device 121. In other words, a packet which is input from any one of the communication ports is transmitted to another communication port according to a predefined transmission rule. Therefore, a packet transmission rule is defined according to characteristics of HSR. Details thereof will be described later.

Next, a description will be made of an HSR frame transmitted to the network 122.

Figure 5:
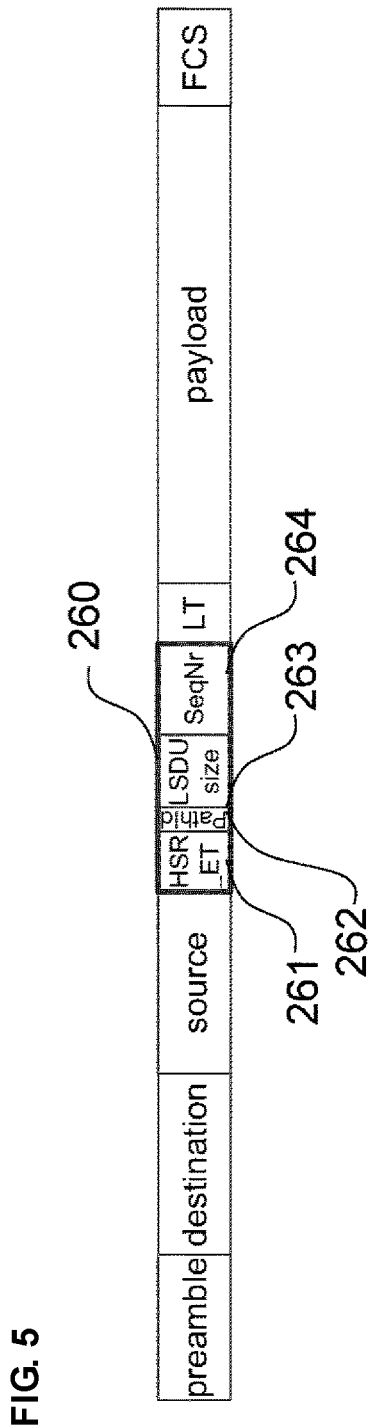
FIG. 5 is a diagram illustrating a communication frame in one embodiment of the invention.

FIG. 5 is a diagram illustrating an HSR communication frame. The HSR communication frame includes "preamble" indicating the head, "destination" indicating a destination of a packet, and "source" indicating a transmission source of the packet. An HSR tag 260 includes "HSR ET" 261 indicating HSR Ethertype, "Path Id" 262 indicating whether the packet is transmitted in the A system direction or the B system direction, "LSDU size" 263 indicating a data size, and "SeqNr" 264 corresponding to a sequence number. The HSR communication frame also includes "LT" indicating encapsulated Ethertype, "payload" corresponding to data to be transmitted, and "FCS" which is checksum for checking errors of the packet. In a case where a VLAN tag which will be described later is used, VLAN tag information of the frame is added in addition thereto.

This frame is created by the communication control section 102 of the communication device 120 which is a data transmission source.

(Operation Procedure)

Next, a description will be made of a flow of an operation in a case where the communication device 120-1a transmits a packet to the communication device 120-1c.

Figure 6:
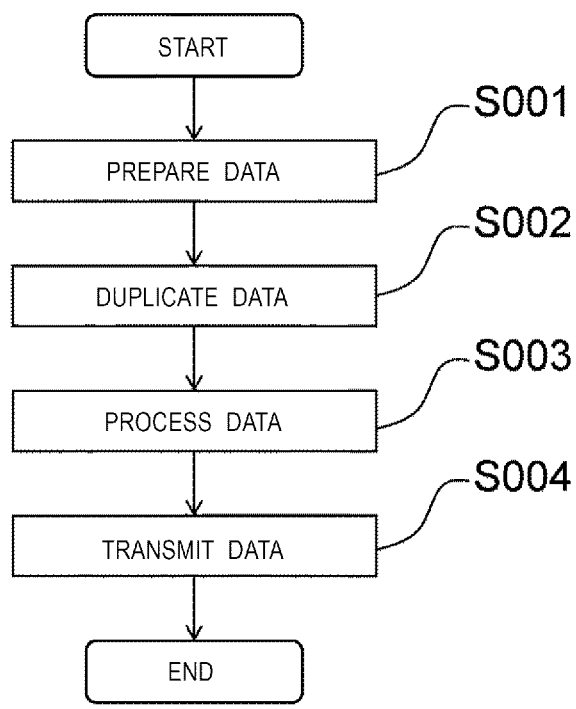
FIG. 6 is a diagram illustrating an execution procedure in one embodiment of the invention.

FIG. 6 illustrates an operation procedure in the communication device 120-1a.

First, an operating on the CPU 101 transmits transmission data to the communication control section 102 by using the bus 106 and the bus 134 (step S001). In the communication control section 102 having received the data, the transmission control unit 130 processes duplicated data items (step S003). The processing performed by the transmission control unit 130 may include, for example, adding of an HSR target, adding of a VLAN tag, computation and adding of CRC, and forming of a packet.

The processed data items are respectively transmitted to the transmission units 132a and 132b, and are transmitted to the A system direction and B system direction networks 122 by using the transmission units 132 and the PHYs 103 (step S004).

A packet 140a transmitted from the communication device 120-1a in the B system direction is transmitted to the communication device 120-1b via the network relay devices 121aB and 121bA.

Figure 7:
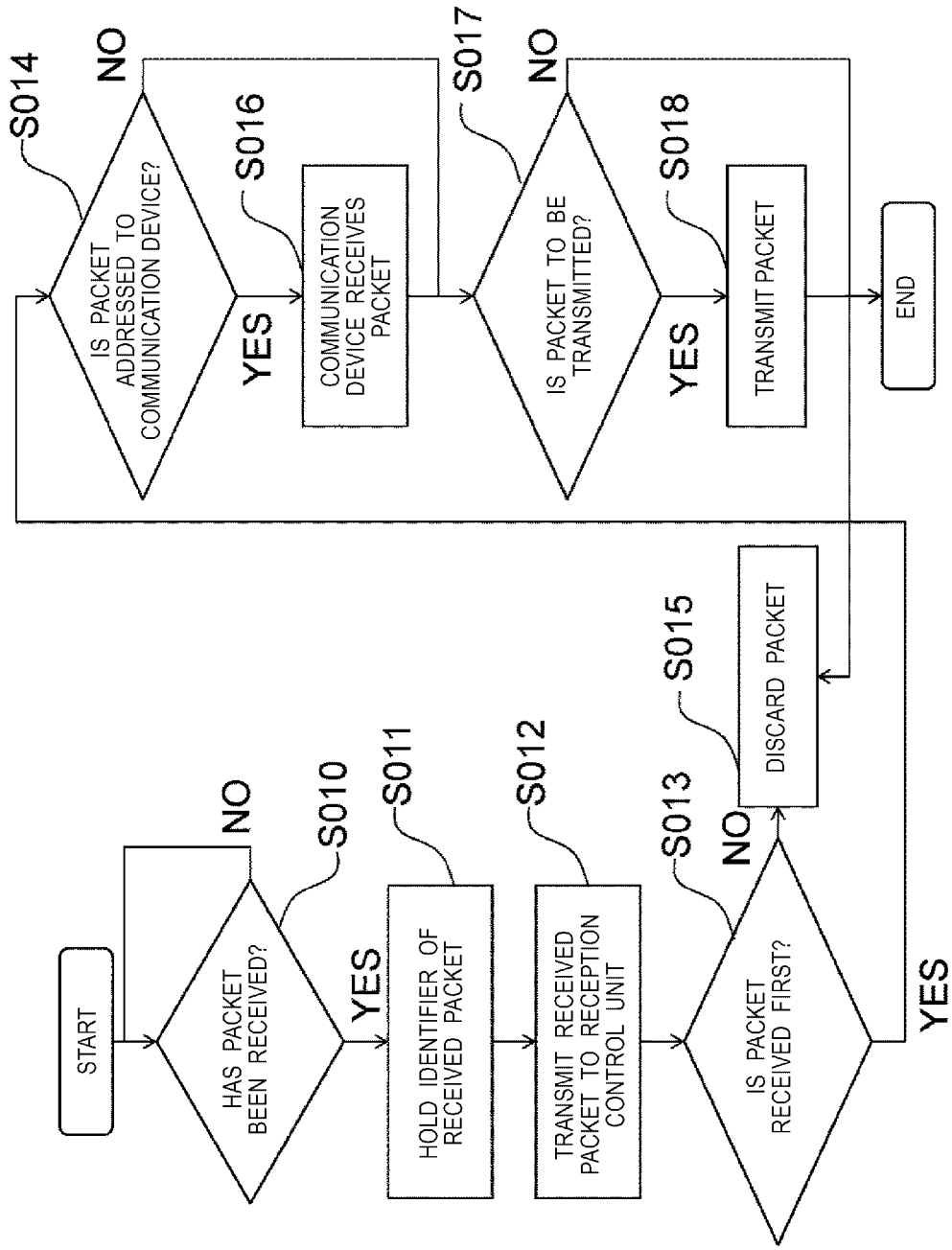
FIG. 7 is a diagram illustrating an execution procedure in one embodiment of the invention.

FIG. 7 illustrates a transmission process in the communication device 120-1b having received the packet 140a.

First, the reception unit 133 waits for a packet to be received (step S010). If the packet has been received, an identifier of the received packet is held (step S011). The packet is transmitted to the reception control unit 131 (step S012). The reception control unit 131 determines whether or not the packet is a packet received first (step S013). If the packet is a packet received first, it is determined whether or not the packet is addressed to the communication device 120 (step S014). If the packet is not a packet received first in step S013, the packet is discarded (step S015).

If the packet is addressed to the communication device 120 in step S014, the packet is transmitted to the CPU 101 by using the bus 135 and the bus 106 (step S016). If the packet is not addressed to the communication device 120 in step S014, or after the process in step S016 is performed, it is determined whether or not the packet is to be transmitted (step S017). Whether or not the packet is to be transmitted may be determined on the basis of, for example, whether a destination address of the packet is a multicast address or a broadcast address.

In a case where the received packet is a packet to be transmitted, the packet is transmitted from the transmission unit 132 of a communication port which is not the communication port having received the packet (step S018).

Figure 8:
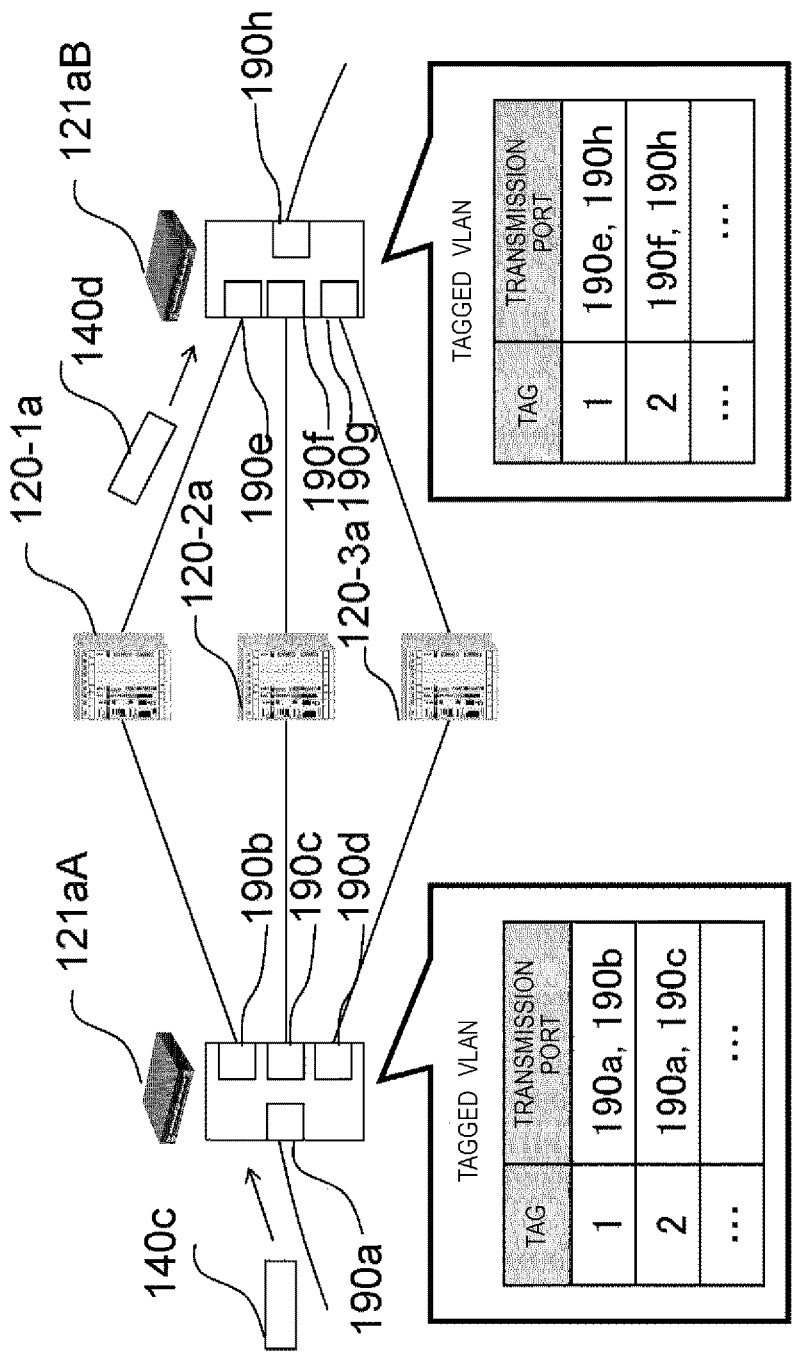
FIG. 8 is a diagram illustrating a set configuration of a network relay device in one embodiment of the invention.

In order to determine whether or not the packet is a packet received first in step S013, the reception control unit 131 includes information storage means for storing information regarding a processed packet for a predetermined period, and stores information (for example, a transmission source address and a sequence number) regarding the processed packet (step S011 in FIG. 8). In HSR, the stored information is erased from the information storage means after the predetermined period elapses. For this reason, even if a packet has the same identifier, the packet is determined as being a first packet in step S013 as long as the identifier is not stored in the information storage means.

The communication device 120-1b having received the packet 140a and the communication device 120-1d having received a packet 140b transmitted from the communication device 120-1a in the A system direction transmit the packets through the transmission process in step S018 in FIG. 7.

(Packet Reception Process)

A reception process in the communication device 120-1c is performed in the same procedure as the procedure in FIG. 7, and a packet is received through the reception process in step S016.

If the network relay device 121 does not know a destination communication port in first reception, or receives a multicast address or a broadcast address, a packet is transmitted in a reverse direction, but a packet received second is discarded by the communication device 120 as a connection destination, and thus the packet does not continuously remain in the network.

As mentioned above, each communication device 120 takes such a procedure, and thus redundant communication can be performed between the communication devices 120. The network relay devices 121 are connected to two communication paths of each communication device 120, and thus a plurality of communication devices 120 can be connected between the network relay devices 121. Consequently, it is possible to construct a highly reliable network with reduced wirings by making failure recovery time using redundant paths zero and by multiplexing a ring network based on a plurality of HSRs.

In a configuration of synchronizing time by using the network, reliability of a time synchronization function can be increased by making a time master redundant. Next, a description will be made of a method of controlling a packet transmission destination in the present example. In the present example, a description will be made of an example in which methods of multiplexing logical networks are combined with each other, duplicating of a packet in a network relay device is suppressed, and IEEE 802.1Q, VLAN is applied.

FIG. 8 is a diagram illustrating a set VLAN configuration of the network relay device 121 focusing on the communication devices 120-1a, 120-2a and 120-3a, and the network relay devices 121aA and 121aB in the configuration illustrated in FIG. 1.

In the set configuration illustrated in FIG. 8, identifiers of multiplexed systems (ring network) are associated with tag numbers of the VLAN. In other words, in a case where the communication device 120-1a belongs to a control system 1, and the communication device 120-2a belongs to a control system 2, a VLAN identifier (hereinafter, referred to as a VID) of a tag for a virtual LAN constituting the control secondary 1 is set to 1, and a VID of a tag for a virtual LAN constituting the control system 2 is set to 2. According to the set configurations of the network relay devices 121h and 121a illustrated in FIG. 8, a packet 140c which is input to the network relay device 121aA is transmitted to an appropriate communication device 120 on the basis of a VID of a VLAN tag in the packet 140c. In other words, in the network relay device 121aA, communication ports 190a and 190b are set for the tag 1, and communication ports 190a and 190c are set for the tag 2. In the network relay device 121aB, communication ports 190e and 190h are set for the tag 1, and communication ports 190f and 190h are set for the tag 2. For example, if a VID of the VLAN tag of the packet 140c received from the communication port 190a is 1, the packet is transmitted to the communication device 120a. Similarly, a packet 140d which is input from a communication port 190e to the network relay device 121aB is transmitted to the communication port 190h since a VID of the VLAN tag in the packet 140d is 1.

As mentioned above, the network relay device 121 controls a packet transmission destination, and thus it is possible to prevent packets from overflowing in the ring network. In other words, for example, since a VLAN is set so that only packets regarding the control system 1 can be transmitted to and received from the communication device 120-1a, it is possible to prevent a communication load on the communication device 120 from increasing even in a case where a plurality of control systems are integrated into a single network system.

Next, a description will be made of an example in which the communication device 120 which uses a VLAN during construction of a network system sets a tagged VLAN in the network relay device 121 with reference to the drawings regarding the communication control section 102 of the communication device 120 in FIG. 5.

As described above, the system identifier conversion unit 151 converts the system identifier 150 of the system included in the communication device 120 into an identifier on a network protocol. The network relay device setting unit 152 sets logical network construction of the network relay devices by using the identifier on the network protocol created by the system identifier conversion unit 151.

The communication device 120 sets a tagged VLAN in the network relay device 121. For example, the communication device 120-1a sets a destination port for a logical network 1 in the network relay devices 121aA and 121aB.

Setting of a logical network in the network relay device 121 may be performed by using setting means provided by the network relay device 121 instead of using the network relay device setting unit 152.

The transmission control unit 130 may use the identifier generated by the system identifier conversion unit 151 in the data processing process in step S003 in FIG. 6. For example, a VLAN tag may be generated or a destination address of an Ethernet header may be set by using a VID generated by the system identifier conversion unit 151.

The reception control unit 131 may control transmission and reception by using the identifier generated by the system identifier conversion unit 151. For example, if a VID of a VLAN tag of a received packet is different from a corresponding VID of the communication device 120 having received the packet, it may be determined that the packet has not been received in step S014 in FIG. 8.

The system identifier 150, the system identifier conversion unit 151, and the network relay device setting unit 152 have been described as functional units of the communication device 120, but may be installed as software in the CPU 101. In this case, for example, holding means of an identifier generated by the system identifier conversion unit 151 may be provided in the communication device 120, and software realizing the system identifier 150 and the system identifier conversion unit 151 may set the identifier in the holding means via the bus 106.

With the above-described configuration, in the present example, it is possible to construct a highly reliable network with reduced wirings by making failure recovery time using redundant paths zero and by integrating a plurality of control systems into a ring network based on a plurality of HSRs. By using a set configuration of the logical network such as a VLAN, it is possible to reduce an increase in an amount of packets in the network relay device 121 and the network 122 and thus to suppress a network load.

Such a network is applicable to networks connecting communication apparatuses including not only the protection control device but also a manufacturing device, a machining tool, a control device (controller) in a plant, a programmable logic controller (PLC), and an intelligent electronic device (IED) in a power system.

Example 2

Example 2 is an example in which reliability of communication is further improved by effectively using communication paths of an integrated system. Reference signs used in Example indicate the same functions, constituent elements, or the like as described in Example 1 unless otherwise mentioned.

Figure 9:
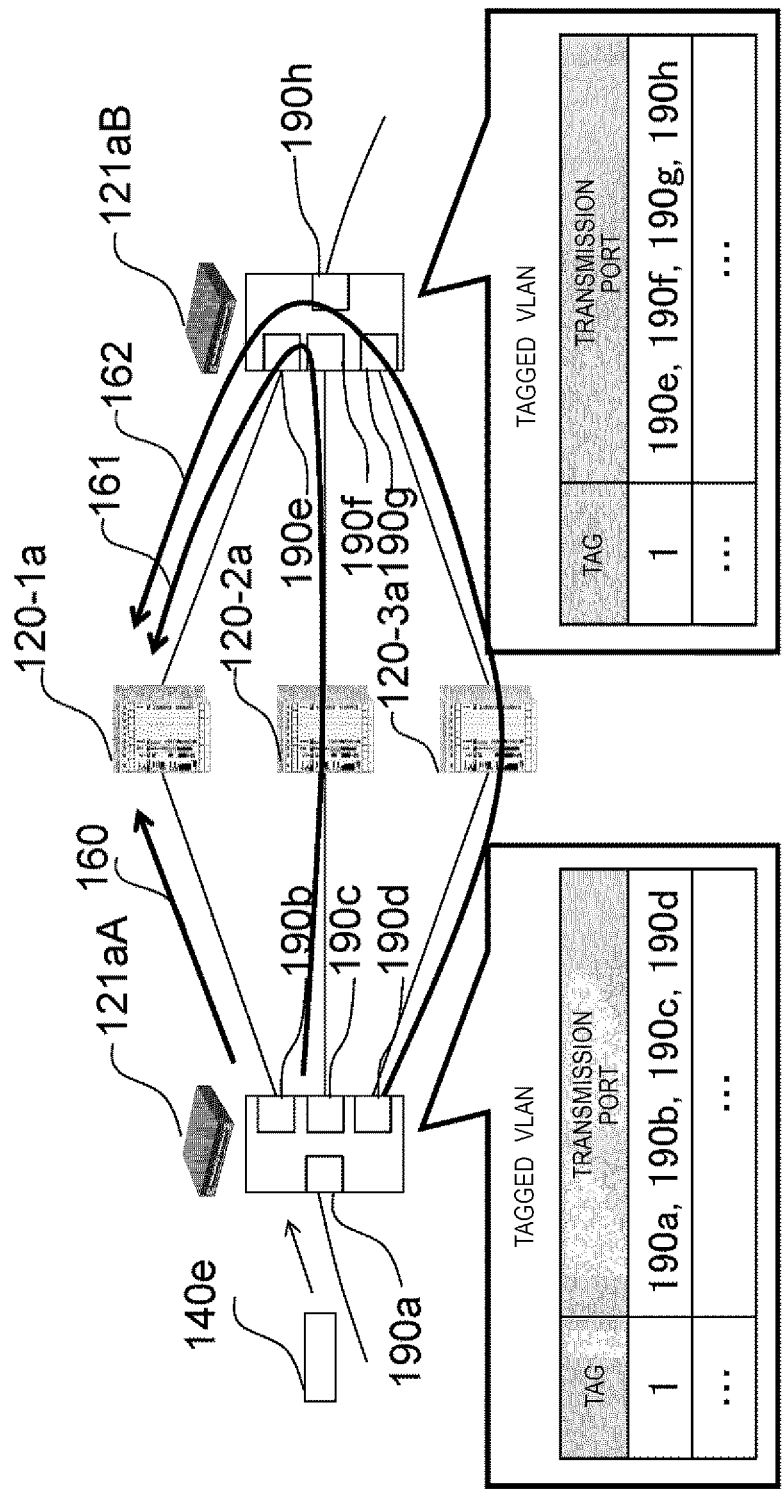
FIG. 9 is a diagram illustrating a set configuration of the network relay device in one embodiment of the invention.

FIG. 9 is a diagram illustrating a set configuration example of the network relay device 121 focusing on the communication devices 120-1a, 120-2a and 120-3a, and the network relay devices 121aA and 121aB in the configuration illustrated in FIG. 1.

In the set configuration of the network relay device 121 in FIG. 9, a plurality of transmission destination ports are set compared with Example 1 illustrated in FIG. 8. In other words, in the network relay device 121aA, communication ports 190a, 190b, 190c and 190d are set for the tag 1, and in the network relay device 121aB, communication ports 190e, 190f, 190g and 190h are set for the tag 1. As illustrated in FIG. 9, if a packet 140e having the tag 1 is input to the network relay device 121aA, the packet is transmitted to the destination communication device 120-1a via communication paths 160, 161 and 162. Therefore, even in a case where a failure occurs in any one of the communication paths 160, 161 and 162, the packet can reach the destination communication device 120. Similarly, even in a case where a destination of the packet 140e is connected to a location beyond the network relay device 121aB, the packet can be transmitted via the three communication paths including the communication devices 120-1a, 120-2a and 120-3a.

As mentioned above, it is possible to improve resistance to a failure by multiplexing communication paths in relation to communication data regarding a major control system.

The number of transmission paths (transmission ports for each tag) may be determined depending on importance of a system, calculation performance of the communication device 120, and performance of calculator resources.

Next, a description will be made of setting of a VLAN tag in the network relay device during construction of a network.

Figure 10:
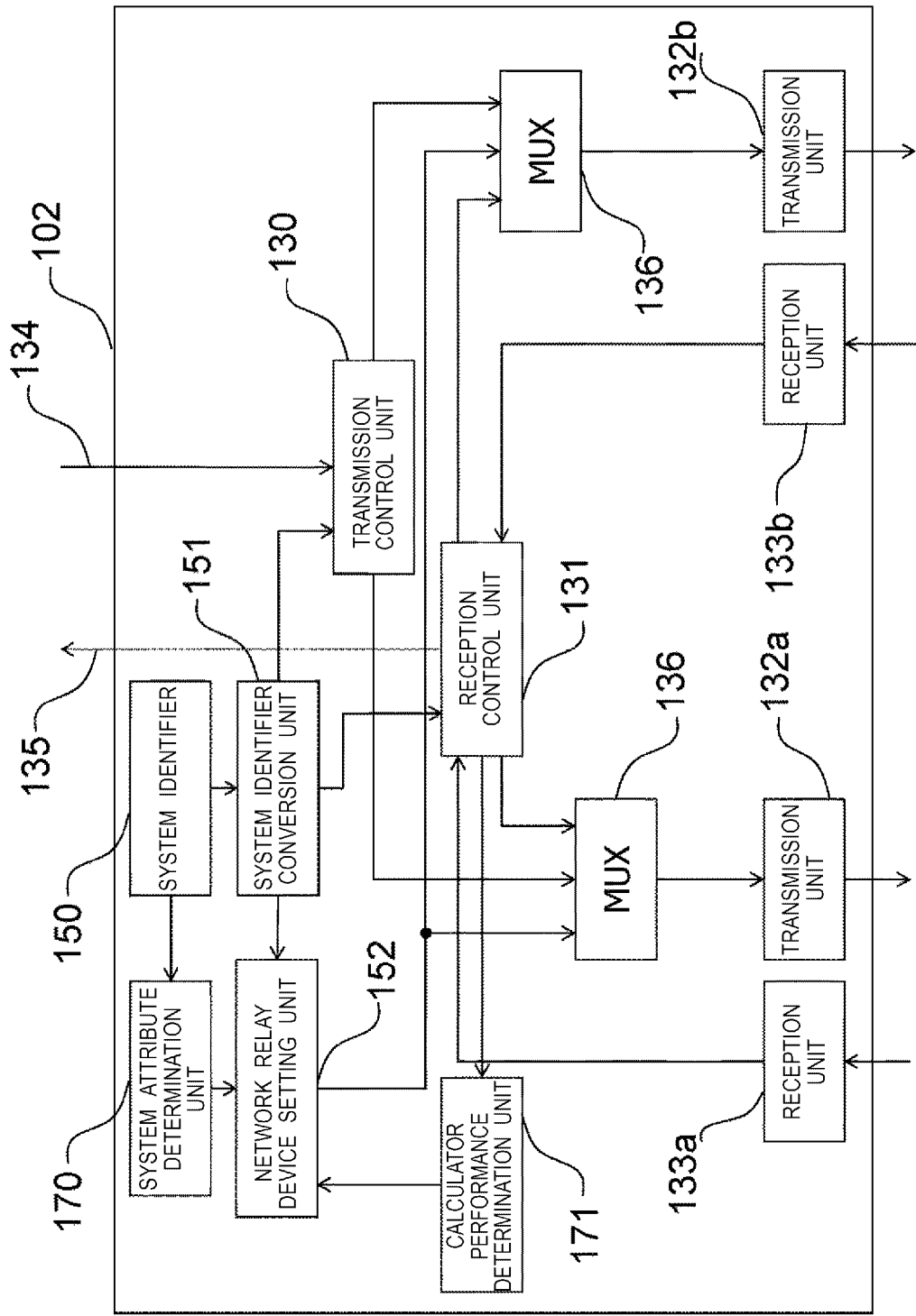
FIG. 10 is a functional configuration diagram in one embodiment of the invention.

FIG. 10 is a diagram illustrating a configuration of the communication device 120 in Example 2.

A difference from Example 1 is that a system attribute determination unit 170 and a calculator performance determination unit 171 are included. The system attribute determination unit 170 determines the importance of the system by using a system identifier, and notifies the network relay device setting unit 152 of a determination result.

Figure 11:
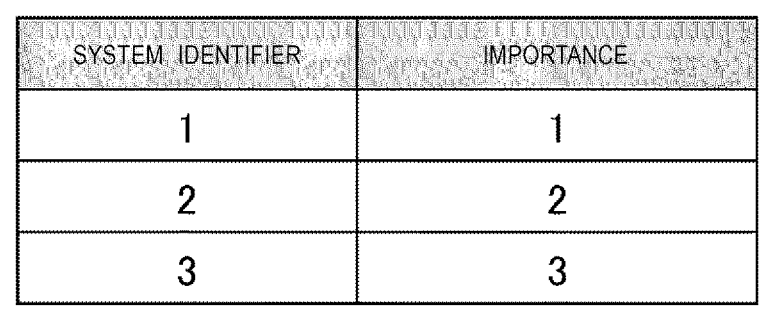

FIG. 11 is a diagram illustrating an example of a conversion table stored in the system attribute determination unit. In this conversion table, system identifiers 1, 2 and 3 are respectively correlated with importance 1, 2 and 3. The system attribute determination unit 170 converts a system identifier into predefined importance by using the conversion table.

The calculator performance determination unit 171 collects calculator performance information regarding the communication device 120 and notifies the network relay device setting unit 152 of the information. The calculator performance information may includes for example, calculation performance of the CPU, storage capacity of the storage medium (the memory 104 and the nonvolatile storage medium 105), communication performance, and the type of operating system (real-time OS, interruption delay, or the like). The information collected by the calculator performance determination unit 171 may be information regarding the communication device 120 including the calculator performance determination unit 171, and may be information regarding other communication devices 120. The calculator performance information regarding other communication devices 120 may be collected via the network 122, and may be collected via networks provided separately from the network 122. Alternatively, the information may be manually set via an external storage medium or input means provided in the communication device 120. For example, an identifier of the communication device 120 may be set along with the calculator performance information.

The network relay device setting unit 152 sets the network relay device 121 according to the importance of the control system, and controls the number of communication ports to which a packet is transmitted. For example, setting may be performed so that, if the importance is highest, a packet is transmitted to all communication ports of the network relay device 121, and if the importance is lowest, the packet is transmitted to only one communication port. The number of communication ports to which a packet is transmitted is adjusted depending on the level of the importance. A transmission destination communication port may be controlled in accordance with calculator performance. For example, the number of packets to be transmitted in the control system may be increased for the communication device 120 with high calculator performance.

Figure 12:
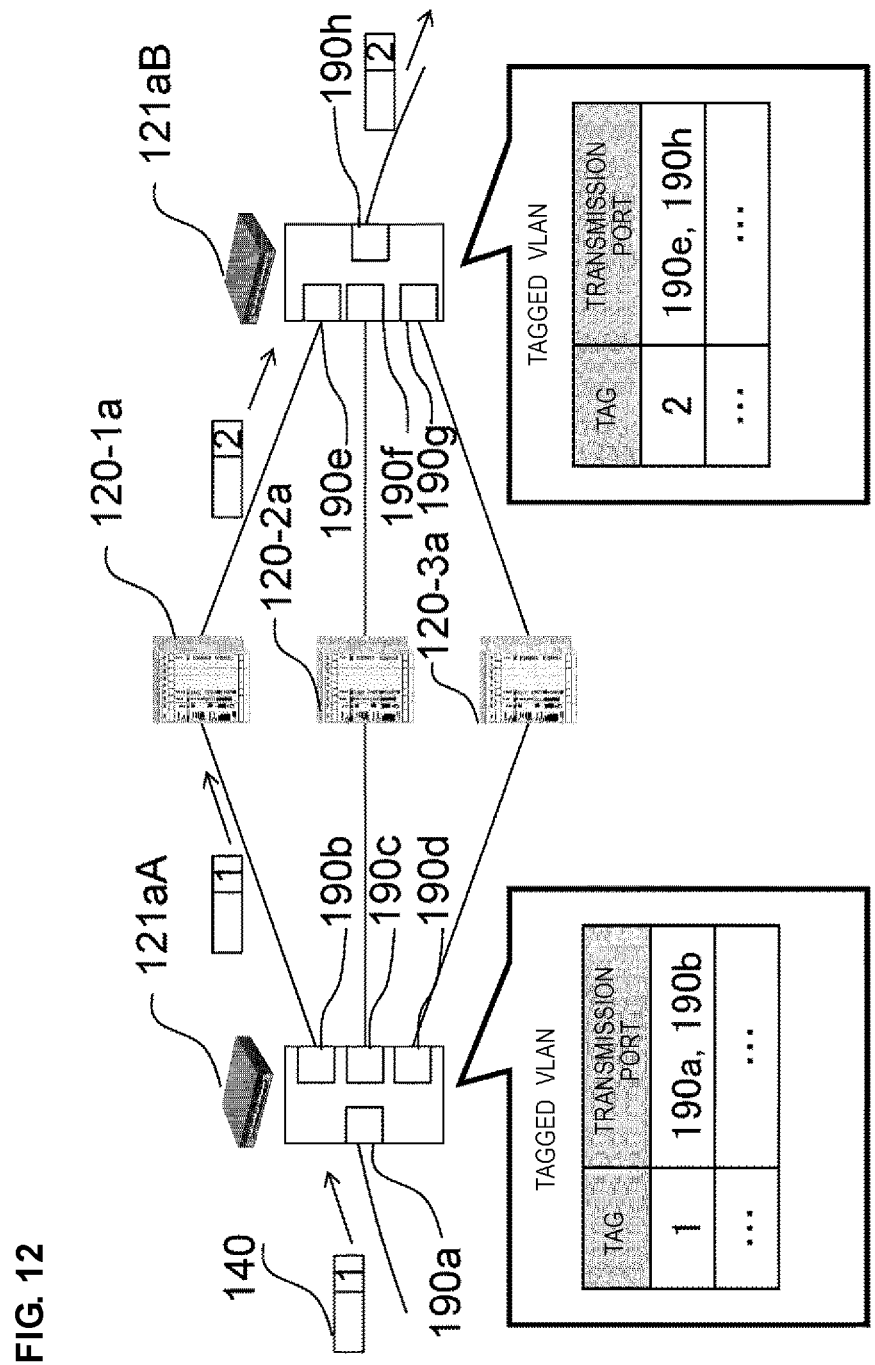
FIG. 12 is a diagram illustrating a set configuration of the network relay device in one embodiment of the invention.

FIG. 12 illustrates a process of changing a VID of a VLAN tag in each communication device 120. For example, in the communication device 120-1*a*, a VID of a VLAN is changed to 2, and, in the network relay device 121*a*B, a packet with a VID of 2 is set to be transmitted to the communication ports 190*e* and 190*h*. With this set configuration, the number of redundant paths can be controlled.

Figure 13:
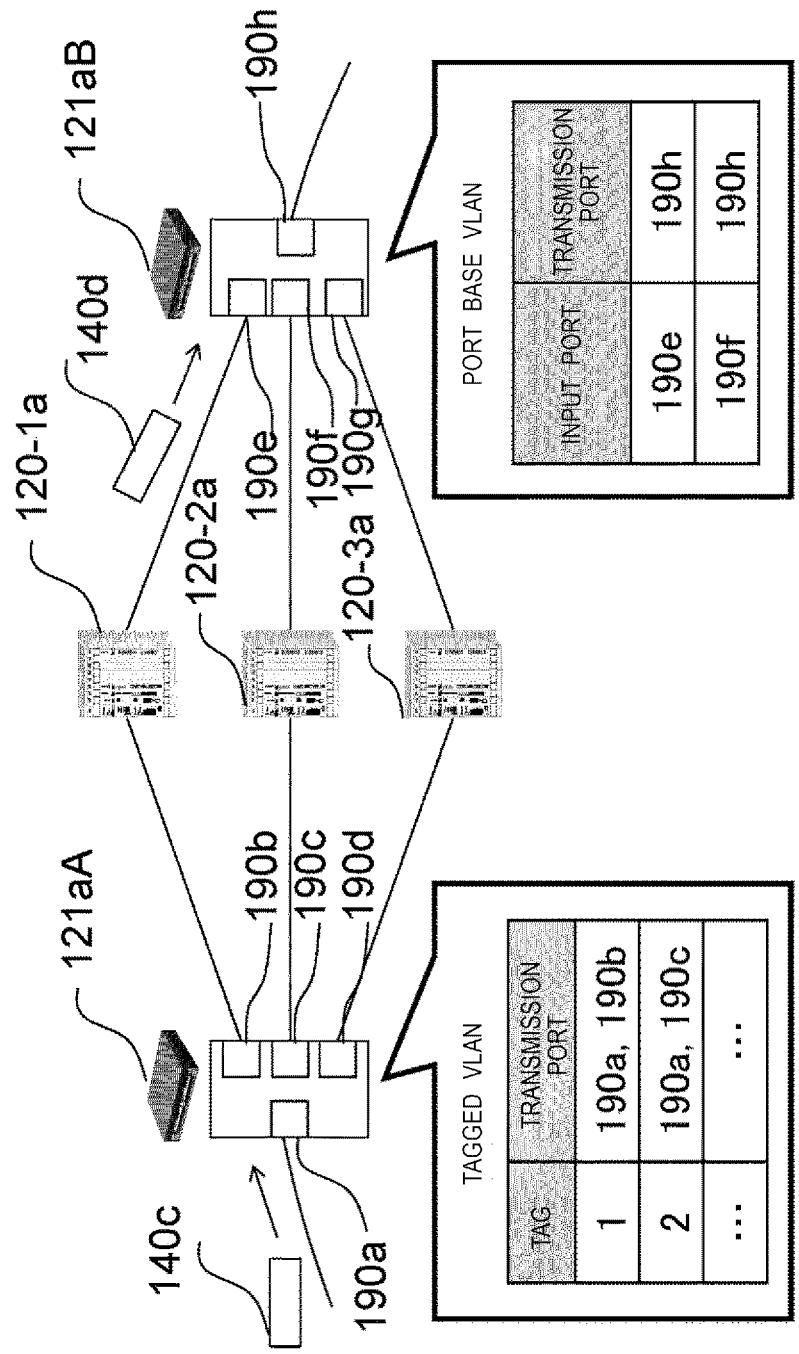
FIG. 13 is a diagram illustrating a set configuration of the network relay device in one embodiment of the invention.

FIG. 13 illustrates an example in which a port base VLAN and a tagged VLAN are combined with each other, and the number of redundant paths is similarly controlled. In other words, in the network relay device aB, like the tagged VLAN, a correspondence relationship between an input port and a transmission port is set for each communication port. Consequently, it is possible to more flexibly construct a system.

As mentioned above, in the present example, it is possible to control the use of redundant paths by controlling a transmission rule in the network relay device 121.

Example 3

Example 3 is an example in which transmission of a packet is controlled by identifying a direction in which the packet is transmitted in the ring network. Reference signs used in Example indicate the same functions, constituent elements, or the like as described in Examples 1 and 2 unless otherwise mentioned.

The communication control section 180 of the network relay device 121 illustrated in FIG. 4 transmits an input packet according to a transmission rule. Therefore, a packet transmission rule is defined according to characteristics of HSR. HSR frames are transmitted from the communication device 120 in both directions of the ring network. Both the directions are respectively referred to as an A system and a B system, and can be discriminated from each other by using the path identifier 262 of the HSR tag 260 of the HSR frame illustrated in FIG. 5.

A connection position of the network relay device 121 is estimated on the basis of the number of A system packets and B system packets input to the communication control section 180 so as to be used for transmission control. This will be described with reference to FIGS. 22 and 23. For convenience of description, a clockwise direction of the ring network will be referred to as a B system direction, and a counterclockwise direction thereof will be referred to as an A system direction.

Figure 14:
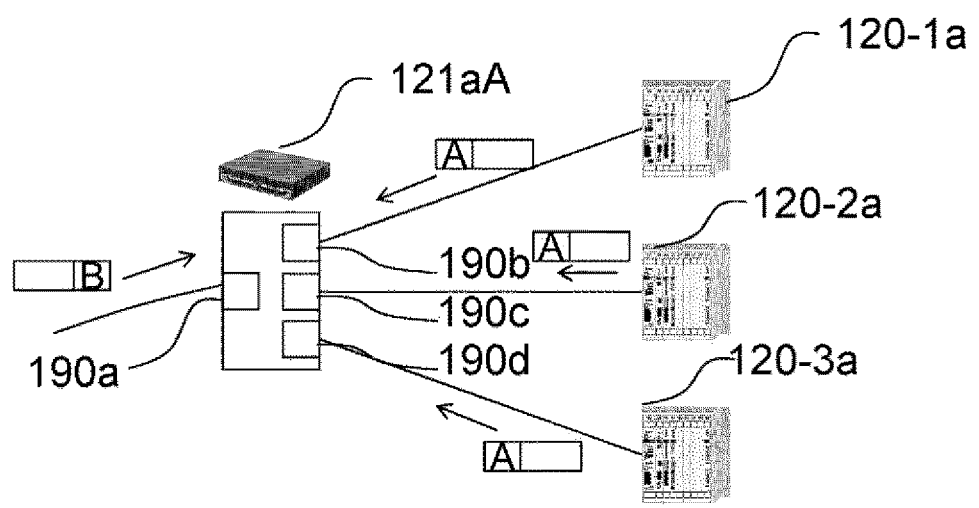
FIG. 14 is a system configuration diagram using one embodiment of the invention.

FIG. 14 is a diagram focusing on the network relay device 121*a*A illustrated in FIG. 1.

Among four communication ports of the network relay device 121*a*A, a B system packet is input from only the communication port 190*a*, and A system packets are input from the other communication ports 190*b*, 190*c* and 190*d*.

On the basis thereof, a description will be made of a determination procedure in each communication port.

Figure 16:
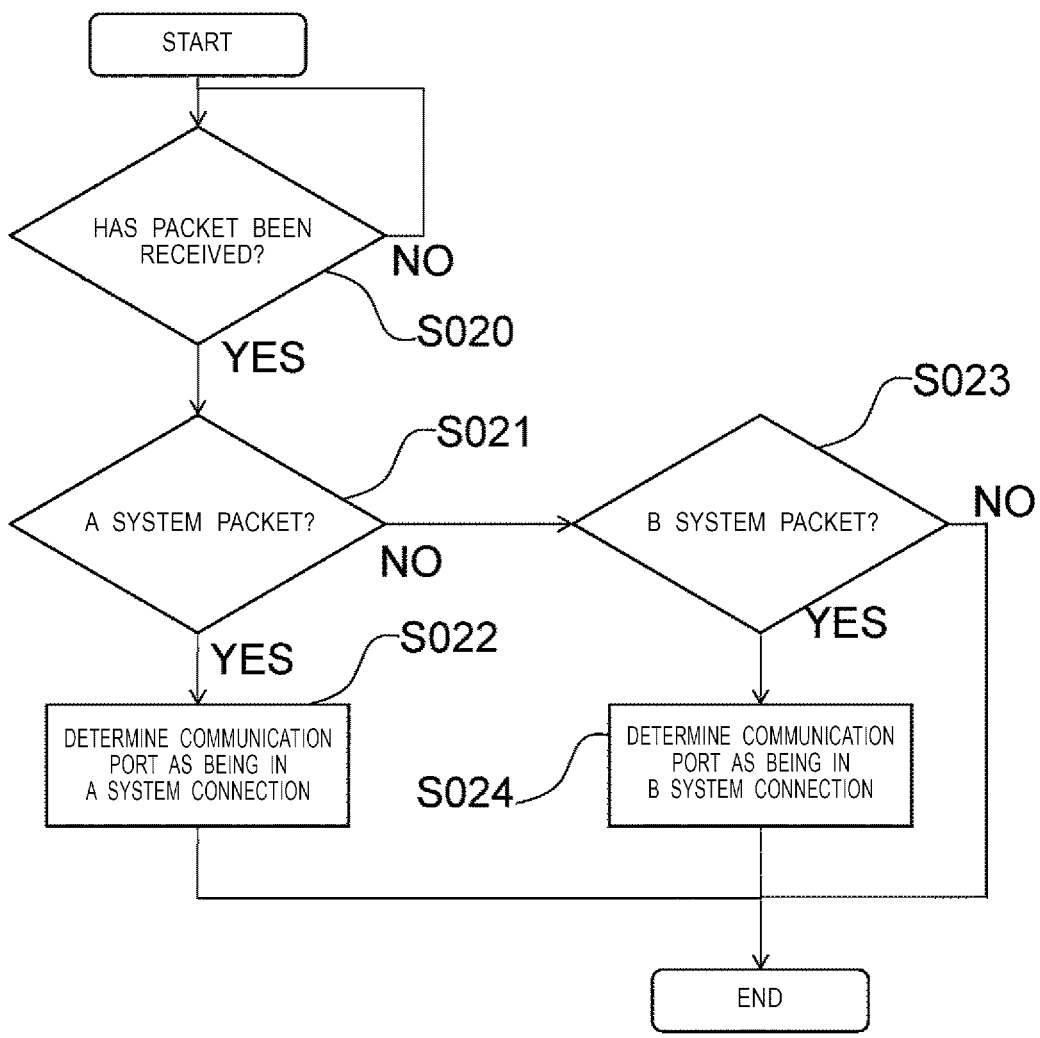
FIG. 16 is a diagram illustrating an execution procedure in one embodiment of the invention.

FIG. 16 is a diagram illustrating a determination procedure in a communication port.

First, reception of a packet is awaited (step S020). Next, it is determined whether or not the received packet is an A system packet (step S021). If the packet is an A system packet, a communication port having received the packet is determined as being in A system connection (step S022). If the packet is not an A system packet in step S021, it is determined whether or not the received packet is a B system packet (step S023). If the packet is a B system packet, a communication port having received the packet is determined as being in B system connection (step S024).

In a case where both an A system packet and a B system packet are received, or neither thereof are received, A system connection and B system connection may not be determined.

Figure 17:
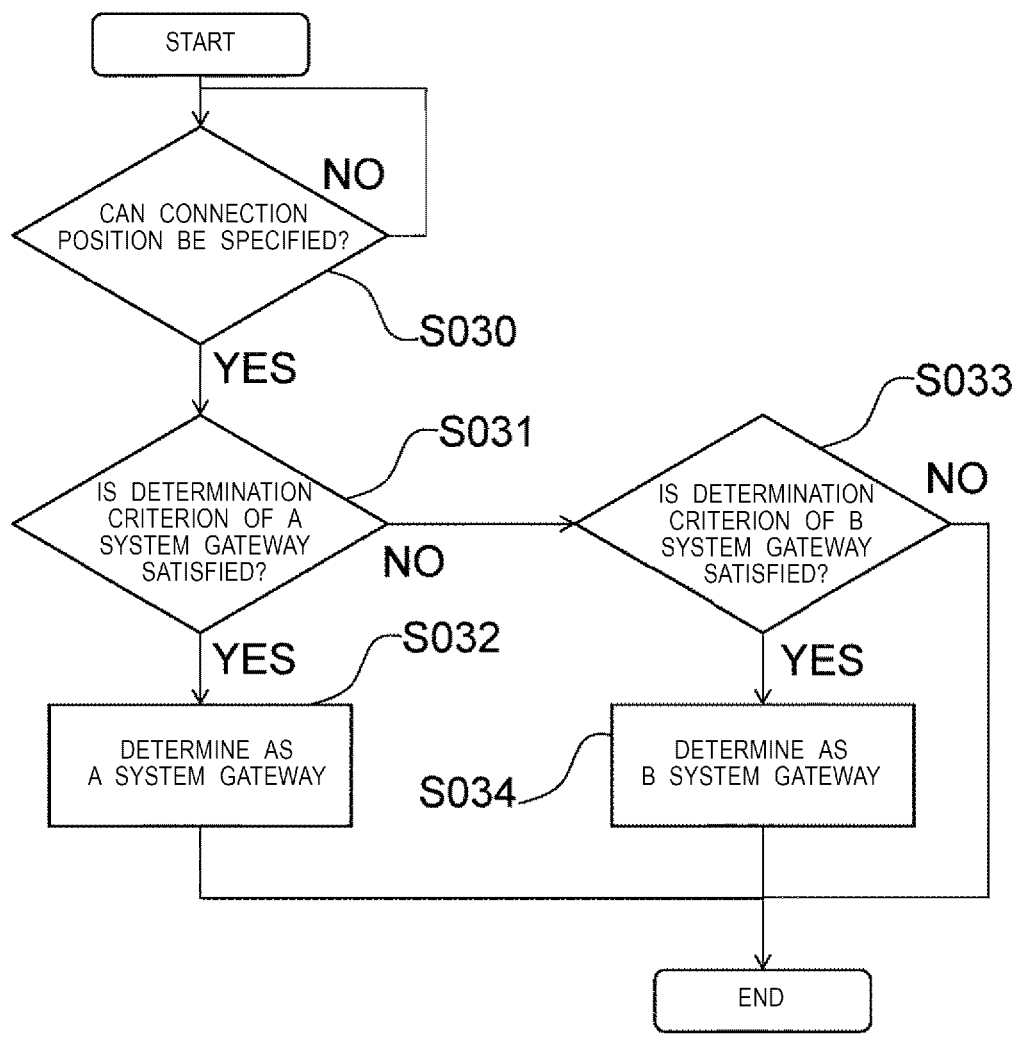
FIG. 17 is a diagram illustrating an execution procedure in one embodiment of the invention.

FIG. 17 is a diagram illustrating a determination procedure in the network relay device 121 in which determination has been performed in each communication port.

A determination result is assumed to be an A system gateway or a B system gateway. The A system gateway is the network relay device 121 connected on the A system communication path of the communication devices 120 connected to the same network relay device 121, and the B system gateway is the network relay device 121 connected on the B system communication path of the communication devices 120 connected to the same network relay device 121. For example, in FIG. 1, the network relay devices 121*a*A, 121*b*A, 121*c*A and 121*d*A are the A system gateways, and the network relay devices 121*a*B, 121*b*B, 121*c*B and 121*d*B are the B system gateways.

First, it is determined whether or not a connection position of the network relay device 121 can be specified (step S030). For example, in a case where no communication port completes the determination procedure illustrated in FIG. 16, determination according to the procedure in FIG. 17 cannot be performed. Regarding a criterion for performing the determination in step S030, in a case where a sum of the number of ports in A system connection and the number of ports in B system connection is equal to or more than a predetermined value, or the number of ports in one system connection is 1, and the number of ports in the other system connection is 2 or larger, the determination can be performed. Next, it is determined whether or not a determination criterion of the A system gateway is satisfied (step S031). The determination criterion may be a case where the number of ports determined as being in A system connection is larger than the number of ports determined as being in B system connection. In a case where the determination criterion of the A system gateway is satisfied in step S031, the A system gateway is determined (step S032). In a case where the determination criterion of the A system gateway is not satisfied in step S031, it is determined whether or not a determination criterion of the B system gateway is satisfied (step S033). The determination criterion may be a case where the number of ports determined as being in B system connection is larger than the number of ports determined as being in A system connection. In a case where the determination criterion of the B system gateway is satisfied in step S033, the B system gateway is determined (step S034).

The determination criteria in steps S031 and S033 are preferably exclusive.

Returning to FIG. 14, in the network relay device 121aA, since the number of B system connections is 1, and the number of A system connections is 3, the network relay device 121aA may be determined as being located at a position connected on the A system communication path side of the communication device 120, and is thus determined as being the A system gateway. Next, the communication device 121aB is focused.

Figure 15:
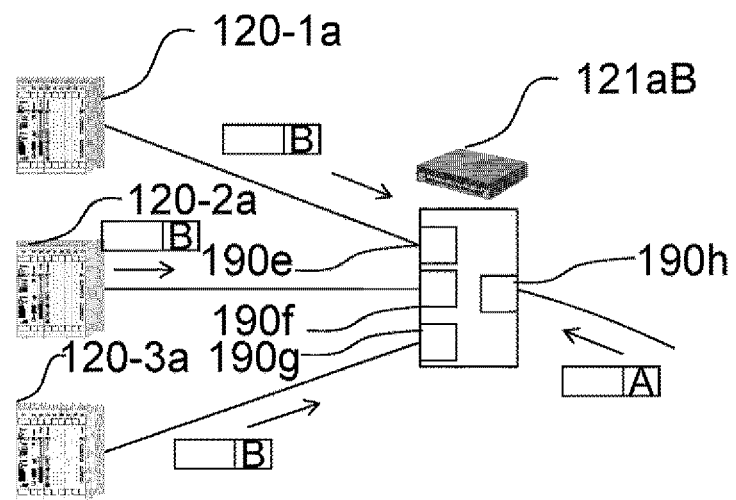
FIG. 15 is a system configuration diagram using one embodiment of the invention.

FIG. 15 is a diagram focusing on the network relay device 121aB illustrated in FIG. 1. In this case, since the number of A system packet is 1, and the number of B system packet is 3, the network relay device 121a may be determined as being located at a position connected on the B system communication path side of the communication device 120, and is thus determined as being the B system gateway.

As mentioned above, if a connection position of the network relay device 121 can be estimated, transmission control can be performed by using the result.

Figure 18:
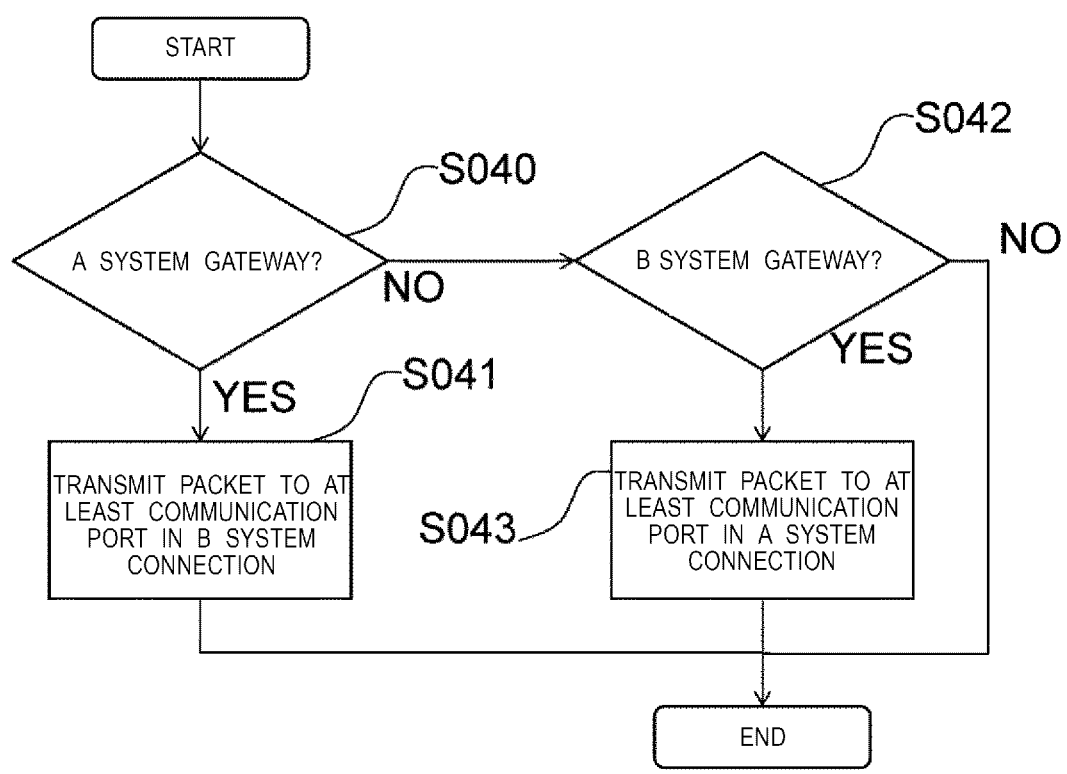
FIG. 18 is a diagram illustrating an execution procedure in one embodiment of the invention.

FIG. 18 is a flowchart illustrating transmission control in the network relay device. First, it is determined whether or not the network relay device is an A system gateway (step S040). If the network relay device is an A system gateway, a packet is transmitted to at least a communication port in B system connection (step S041). If the network relay device is not an A system gateway in step S040, it is determined whether or not the network relay device is a B system gateway (step S042). If the network relay device is a B system gateway, a packet is transmitted to at least a communication port in A system connection (step S043).

For example, FIG. 14 illustrates an example in which, since the communication port 190a is located on an opposite side to the group of the communication devices 121a, 121b and 121c, a packet input to the communication port 190a is transmitted to the other communication ports 190b, 190c and 190d, and, on the other hand, packets input respectively from the communication ports 190b, 190c and 190d are transmitted to at least the communication port 190a.

In this case, a packet may be transmitted to the communication port 190 in the same system connection. For example, a packet received by the communication port 190b may be transmitted to the communication ports 190c and 190d. By using such multiple paths, high reliability can be achieved in a case where destinations of a packet are the communication devices 121b and 121c.

In order to increase accuracy of the determinations described in FIGS. 16 and 17, the reception control unit 131 may convert the path identifier 262 when a packet is transmitted. For example, there is a case where a packet transmitted as the A system from the communication device 120-1a illustrated in FIG. 1 may be transmitted to the network relay device 121aA located ahead thereof, and may be received by the A system communication ports of the communication devices 120-2a and 120-3a. When the packet is transmitted from the B system communication port in this state, the path identifier 262 is corrected to the B system.

Instead of estimation from the content of a packet, an A system gateway or a B system gateway may be explicitly set in the network relay device 121, and A system connection or B system connection may be explicitly set in each communication port of the network relay device 121. A destination port during transmission may be designated. In a case where there are a plurality of destination ports, for example, the network relay device 121 may have a duplicating function and may duplicate a packet.

When the network relay device 121 cannot be estimated as an A system gateway or a B system gateway, the same operation as in the network relay device 121 of the related art may be performed (transmission of a packet to a transmission port or transmission according to a set VLAN configuration).

Such a function may be provided not as the network relay device 121 but as a dedicated controller, an industrial PC, a control calculator, an intelligent electronic device (IED), or a protection control device.

(Transmission Control in Communication Device 120)

Next, a description will be made of transmission control in the communication device 120 in the present example. In the present example, packet transmission control is also performed in the communication device 120.

The transmission method in which an identifier of a control system to which the communication device 120 belongs is taken into consideration has been described in the function units illustrated in FIG. 5. In other words, the communication device 120 receives and transmits a packet of the same system, and discards a packet of a different control system.

A description will be made of packet transmission control in which position information in the ring network is taken into consideration.

Figure 19:
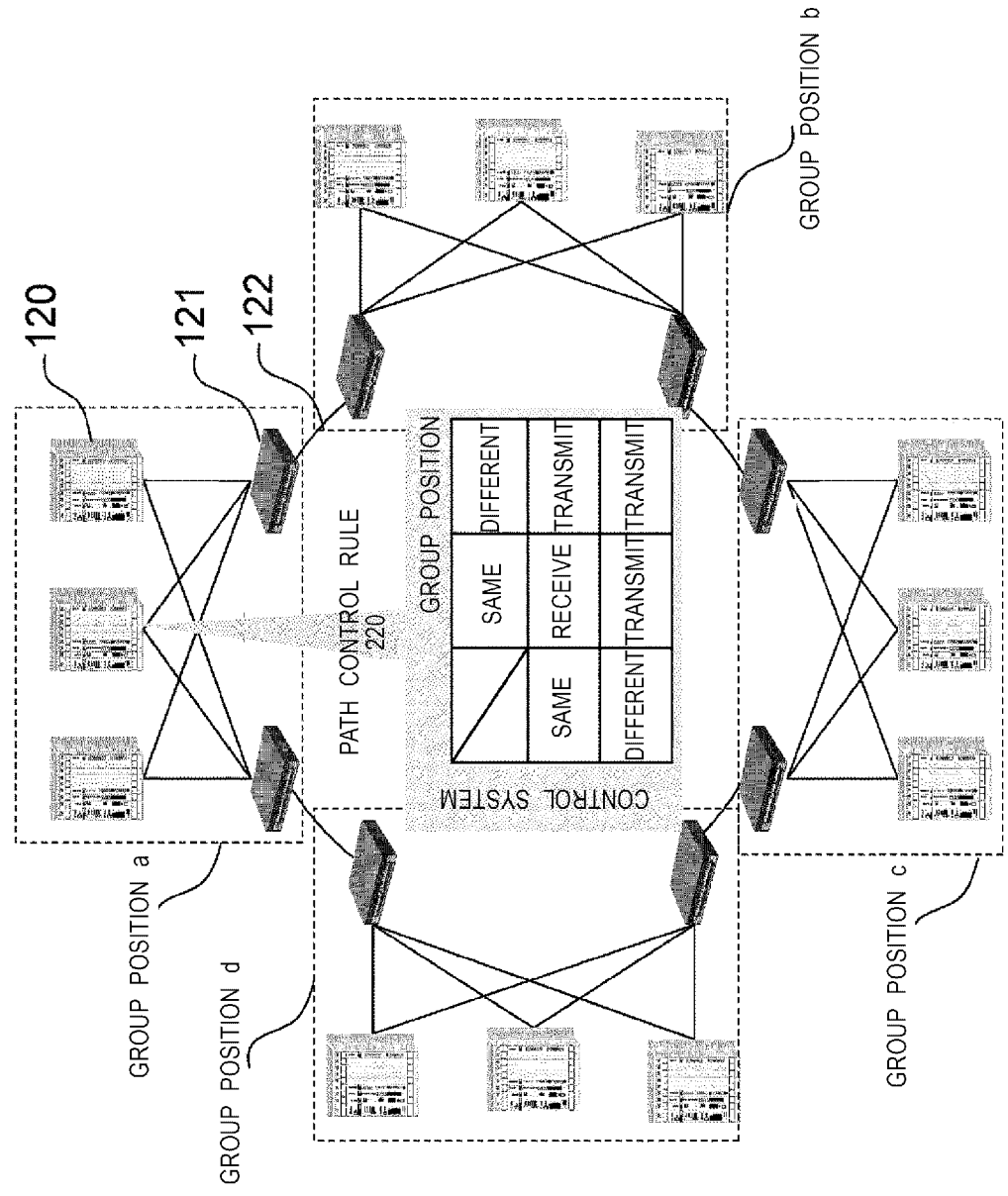
FIG. 19 is a diagram illustrating an execution procedure in one embodiment of the invention.

FIG. 19 is a diagram illustrating a transmission control example using a group position. Each communication device 120 stores group position information along with an identifier (for example, 1, 2, and 3) of a system to which the communication device belongs. Information regarding the control system and the group position information are reflected on a packet, and each communication device 120 controls transmission according to the information.

Regarding a method of reflecting the control system information and the group position information, for example, the information may be reflected on, for example, a multicast address, a VID of a VLAN, an HSR tag, an IP address, and other protocol headers. For example, in the multicast address range 01-15-4E-00-01-XX which can be used in HSR, high-order 4 bits of the last one octet may be allocated to a system identifier, and low-order 4 bits thereof may be allocated to a group position. For example, 01-15-4E-00-01-12 is assumed to indicate the communication device 120 which belongs to the control system 1 and is located at a group position b (a group position a is allocated to a MAC address 1, and the group position b is allocated to a MAC address 2).

A reception process in the communication device 120 is performed as in FIG. 7. The reception process is controlled by using system and group position information acquired from a packet received by the communication device 120, and a path control table 220.

FIG. 19 is referred to again. The path control table 220 is a table defining a correspondence relationship of packet transmission control performed on the basis of correspondence between system information and group position information obtained from the received packet, and control system information and group position information of the communication device 120 having received the packet. Transmission of the packet is controlled by referring to the table.

For example, if control systems are the same as each other, and group positions are the same as each other, a packet is received. If control systems are the same as each other, and group positions are different from each other, a packet is transmitted. If control systems are different from each other, and group positions are the same as each other, a packet is transmitted. If control systems are different from each other, and group positions are different from each other, a packet is transmitted. In this set configuration, high reliability can be achieved by using redundant paths.

Figure 20:
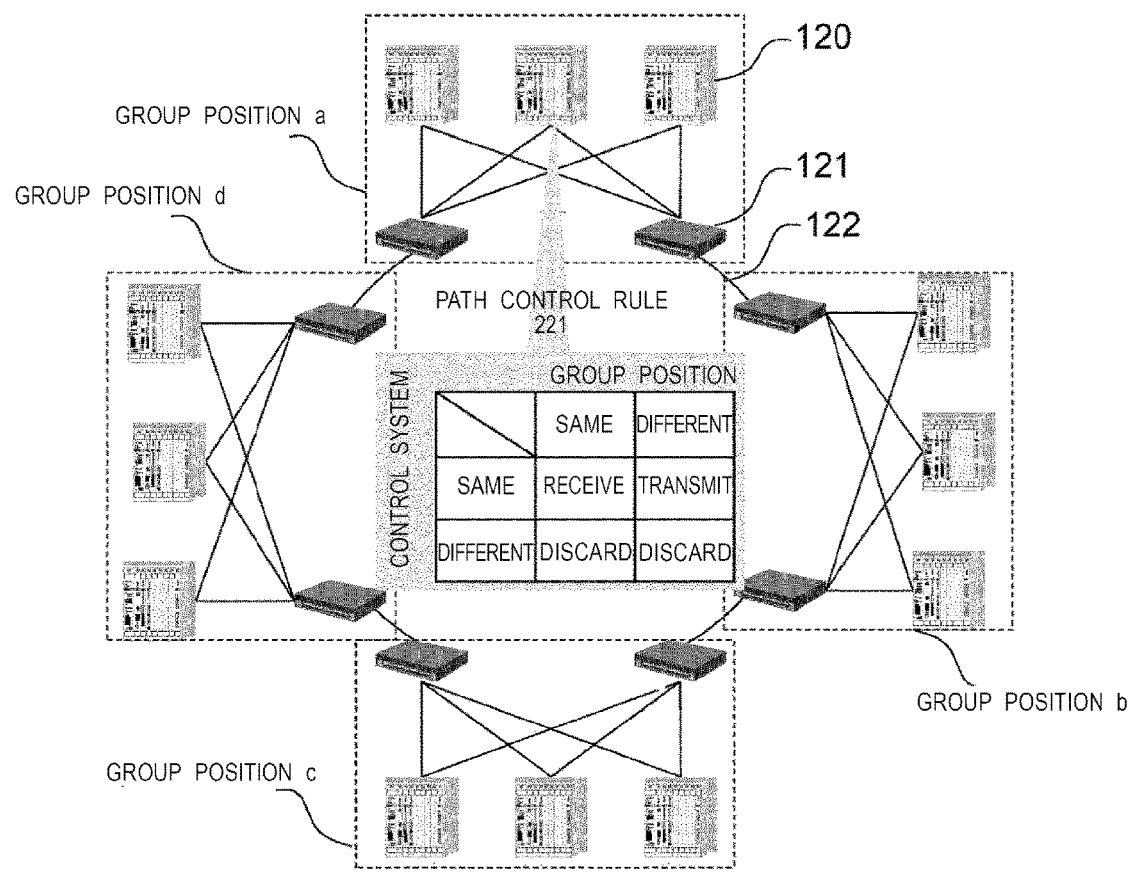
FIG. 20 is a diagram illustrating packet transmission control in one embodiment of the invention.

FIG. 20 is a diagram illustrating another transmission control table 221. A difference from FIG. 19 is that, if control system information is different, a packet is discarded. In the above-described way, it is possible to prevent unnecessary transmission of a packet.

Figure 21:
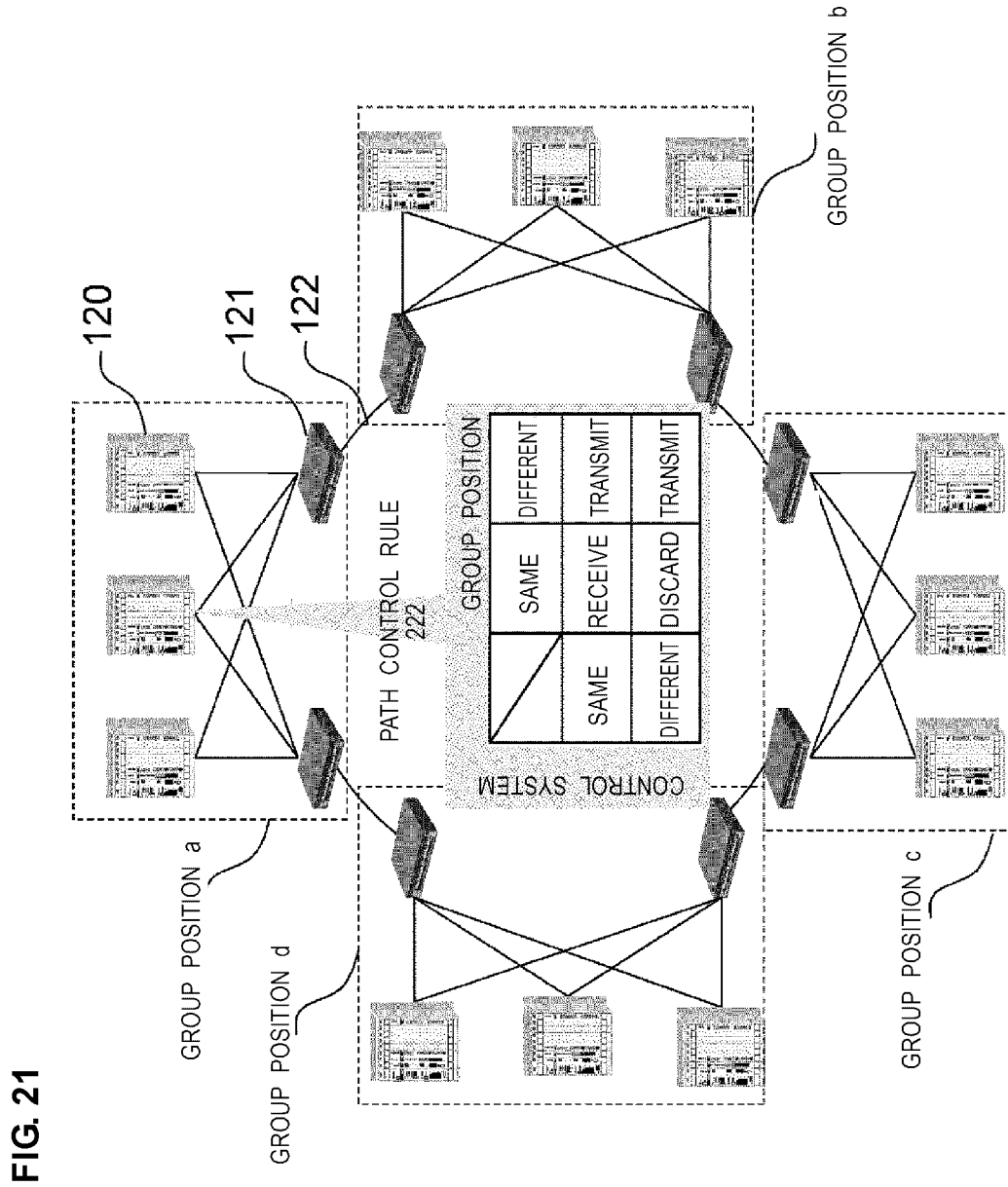
FIG. 21 is a diagram illustrating packet transmission control in one embodiment of the invention.

FIG. 21 is a diagram illustrating still another transmission control table 222. If control systems are different from each other, and group positions are the same as each other, a packet is discarded. If control systems are different from each other, and group positions are different from each other, a packet is transmitted. In the above-described way, high reliability is achieved by using redundant paths up to a group position where a destination communication device 120 is located, and a packet is discarded in communication devices other than the destination communication device 120 in the target group position. Therefore, it is possible to prevent unnecessary occurrence of a packet in the destination communication device 120 and the subsequent communication devices.

The transmission controls illustrated in FIGS. 19 to 21 may be different from each other for each communication device 120, and may be dynamically switched.

Figure 22:
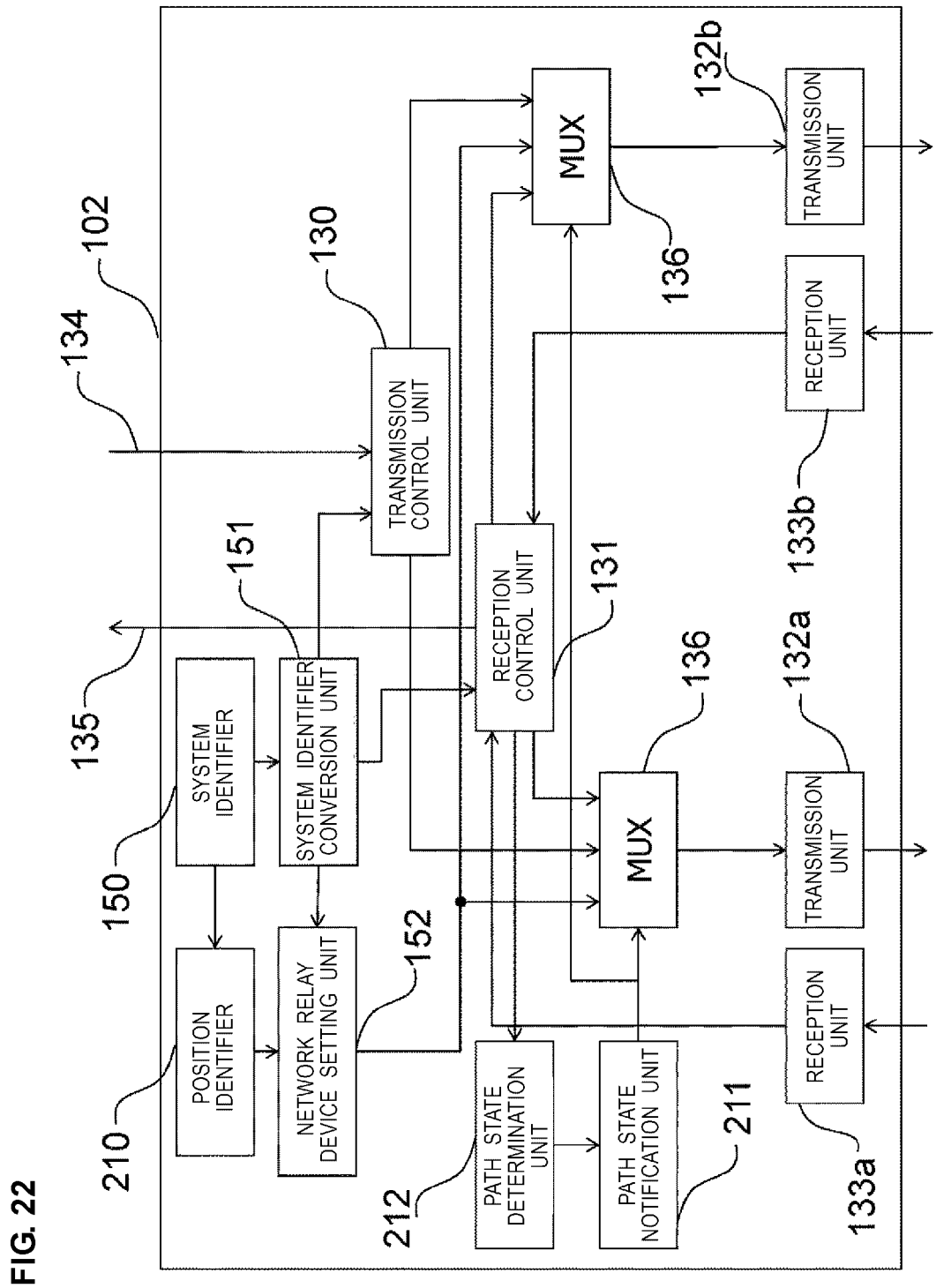
FIG. 22 is a functional configuration diagram in one embodiment of the invention.

FIG. 22 is a diagram illustrating a configuration of the communication control section 102 of the communication device 120 when transmission rules are dynamically switched depending on a state of a communication path. A difference from Examples 1 and 2 is that a path state determination unit 212 and a path state notification unit 211 are provided. For example, in a case where the number of received packets is small, and an abnormality can be estimated to occur in a communication path, despite paths being made redundant, in a case where an abnormality (CRC error, a data size abnormality, or the like) occurs in a packet, and in a case where a processing load on the communication device 120 increases, the path state determination unit 212 determines this state, and notifies the path state notification unit 211 of the state. The path state notification unit 211 transmits the notification content from the path state determination unit 212 to other communication devices 120.

Each communication device 120 having received the notification from the path state determination unit 212 dynamically switches the rules illustrated in FIGS. 19 to 21. The switching may be performed by receiving the notification, and may be performed when the number of times of receiving notifications is equal to or larger than a predetermined value, or depending on the number of times of continuously receiving notifications within a predetermined period, or the importance of an error whose notification is sent.

As mentioned above, it is possible to achieve high reliability of packet communication by using redundant paths. HSR and PRP can handle only duplex, but, in the invention, higher reliability can be achieved since paths corresponding to the number of multiplexed systems can be used.

Example 4

Example 4 is the invention in which each communication device 120 can perform communication of a state thereof with the communication devices 120 or a maintenance apparatus, and thus an abnormality of the communication device 120 or an abnormality of a communication path is detected. Reference signs used in Example indicate the same functions, constituent elements, or the like as described in Examples 1, 2 and 3 unless otherwise mentioned.

Figure 23:
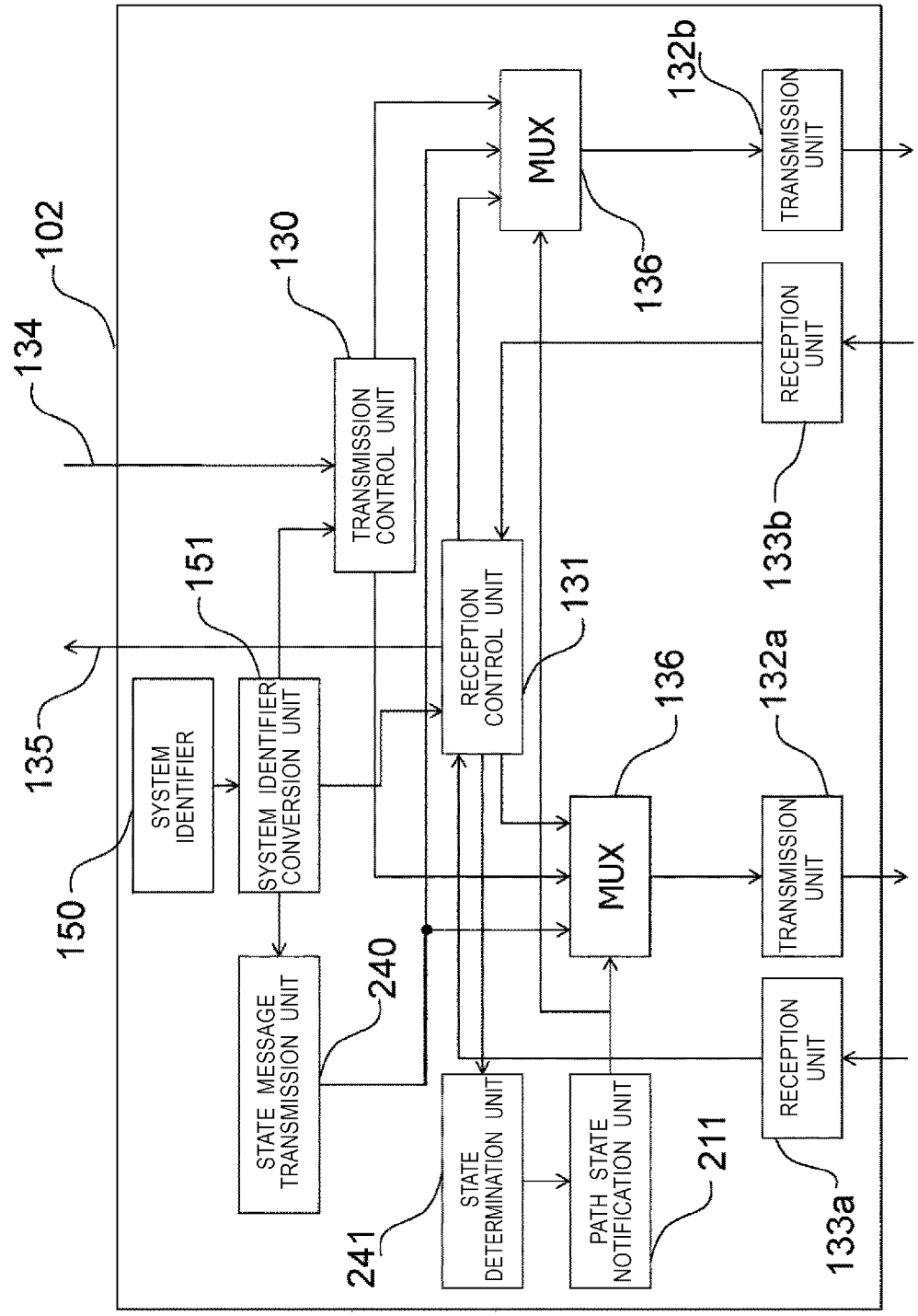
FIG. 23 is a functional configuration diagram in one embodiment of the invention.

FIG. 23 is a diagram illustrating a configuration of the communication control section 102 of the communication device 120 in Example 4. A difference from the above Examples is that a state message transmission unit 240 and a state determination unit 241 are provided.

The state message transmission unit 240 notifies other communication devices 120 of a state of the communication device. During the notification, a communication frame to which an identifier of the communication device 120 and a message indicating a state thereof are attached is sent to other communication devices 120 through broadcast or multicast communication.

Here, the state message transmission unit 240 may determine not only a state of the communication device 120 but also states of other communication devices 120 and may transmit a state message. In this case, an identifier of a determination target communication device 120 is carried on a communication frame and is transmitted. In a case of sending a notification of states of a plurality of communication devices 120, state information of the plurality of communication devices 120 may be carried on a single communication frame.

Each communication device 120 may perform communication of this state message by using an HSR management frame or in a separate communication format.

The other communication devices 120 receive the state message, and can thus monitor the existence of the corresponding communication device 120 and confirm that a communication path is in a normal state. Alternatively, in a case where a certain abnormality occurs even if a communication path is in a normal state, the communication device 120 may store information indicating the abnormality in a state message. Such an abnormality may include, for example, a case where abnormalities occur in peripheral apparatuses, a control device, a sensor, an actuator, and the like connected to the communication device 120, or an abnormality of the communication device 120 (an abnormality in a level in which an operation of the communication device can be continuously performed and thus a state message can be transmitted, for example, in a case where an ECC error occurs in a memory whose storage capacity is reduced).

The state message may be periodically transmitted, and may be transmitted in a case where a state of a target changes.

Alternatively, an identifier of the communication device 120 may be added to a state message received from another storage unit 120. With this configuration, it is possible to identify a communication path of the storage medium. In a case where an abnormality occurs in a communication path, it is possible to estimate the abnormality location by comparing a plurality of state messages with each other.

For example, in FIG. 1, in a case where a state message transmitted from the communication device 120-1*b* is received by the communication device 120-1*d*, if a state message added with an identifier of the communication device 120-1*a* and only a state message added with only an identifier of the communication device 120-2*a* are received, an abnormality of the communication device 120-3*a*, and abnormalities of a communication path between the network relay device 121*a*B and the communication device 120-2*a* and a communication path between the communication device 120-2*a* and the network relay device 121*a*A are estimated.

The state determination unit 241 determines an abnormality of another communication device 120 or a communication path on the basis of a state message received from another communication device 120. In a case where it is determined that an abnormality occurs in the communication device 120 or the communication path, the state determination unit 241 notifies another communication device 120 of abnormality detection via the path state notification unit 211.

Another communication device 120 having recognized the notification from the state determination unit 241 may dynamically switch the rules illustrated in FIGS. 19 to 21, may change the set VLAN configuration of the network relay device 121, or may use redundant paths and change redundant paths which are used, so as to handle the abnormality.

The abnormality of the communication path may be determined by a maintenance apparatus having the function of the state determination unit 241. The maintenance apparatus is preferably connected to each communication device 120 via the network 122 or a separate system network.

In a case where the state determination unit 241 detects an abnormality, an operator may be notified of the abnormality with any notification means (an electronic mail, display on a display, lighting, sound, and the like).

If the abnormality is detected, the operator may replace the communication device 120. The communication device 120 may be replaced regardless of an abnormality.

In a case where a communication path connected to the communication device 120 is a long distance of several km or more, an additional long cable should be prepared during replacement thereof. In such a case, a plurality of long cables for replacement are not required to be prepared through layering in a local spot base as will be described later in FIG. 25. Consequently, it is possible to reduce cost (mainly corresponding to the cables) for the replacement.

With the above-described inventions, it is possible to establish communication for a highly reliable control system so as to handle abnormalities of the communication devices 120 and communication paths.

(Other Network Topology Configurations)

In the above-described Examples, the communication devices 120 constituting the ring network as in FIG. 1 are connected to each other via two network relay devices 121 (for example, the communication device 120-1*a* and the communication device 120-1*b* are connected to each other via the network relay device 121*a*B and the network relay device 121*b*A), but the number of network relay devices may be one, and may be plural.

The communication device 120 may be connected between the network relay devices 121 (for example, the network relay device 121*a*B and the network relay device 121*b*A).

A plurality of relay devices 120 in the same base are all not required to be connected in parallel to each other as illustrated in FIG. 1, and some of the relay devices may be connected in series to each other.

Any network which can transmit a packet is applicable between the network relay devices 121 (for example, the network relay device 121*a*B and the network relay device 121*b*A), and may be, for example, a mesh network, various control networks defined in IEC 62439, and networks in which a loop is prevented by Spanning Tree Protocol (STP) or Rapid Spanning Tree Protocol (RSTP).

Bypass paths are added through connection to the communication devices 120 or the network relay devices 121 in other bases, and thus it is possible to achieve high reliability. For example, the communication device 120-1*a* illustrated in FIG. 1 is connected to the network relay device 12*c*A or the communication device 120-1C, or the network relay device 121*a*A is connected to the network relay device 121*c*B, and thus it is possible to make new communication paths redundant. Preferably, a communication device preventing transmission of a packet received second or later, such as the communication device 120, is disposed between the network relay device 121 and the network relay device 121, in order to prevent packet loops.

Figure 24:
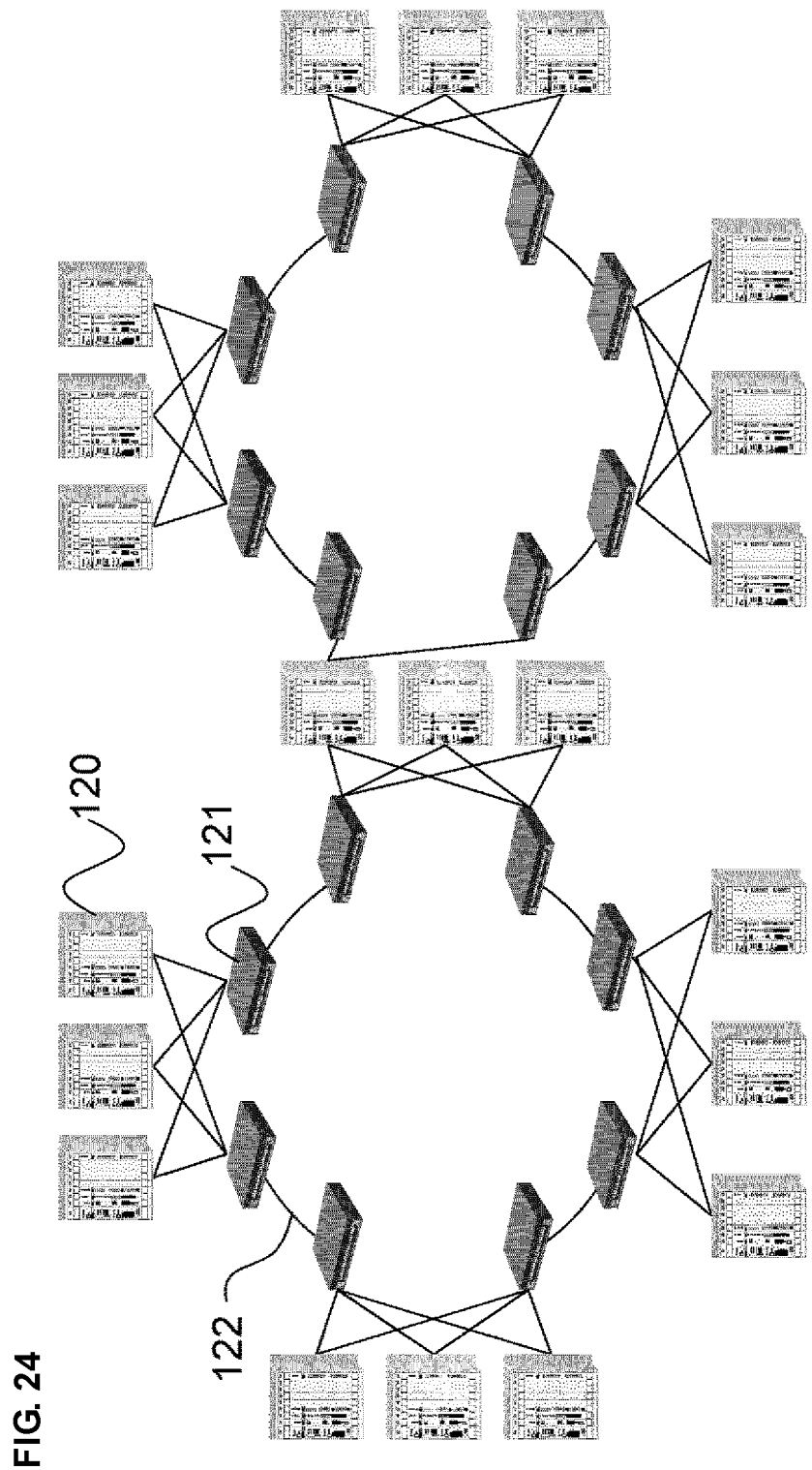
FIG. 24 is a system configuration diagram using one embodiment of the invention.

As illustrated in FIG. 24, a layered structure may be applied to topology of the communication devices 120, and thus a system configuration may have a degree of freedom. FIG. 24 illustrates an example in which separate ring networks are connected to each other via the network relay devices 121. The ring networks may be connected to each other via the communication devices 120, and may be connected to each other via RedBox or QuadBox defined in IEC 62439-3.

Figure 25:
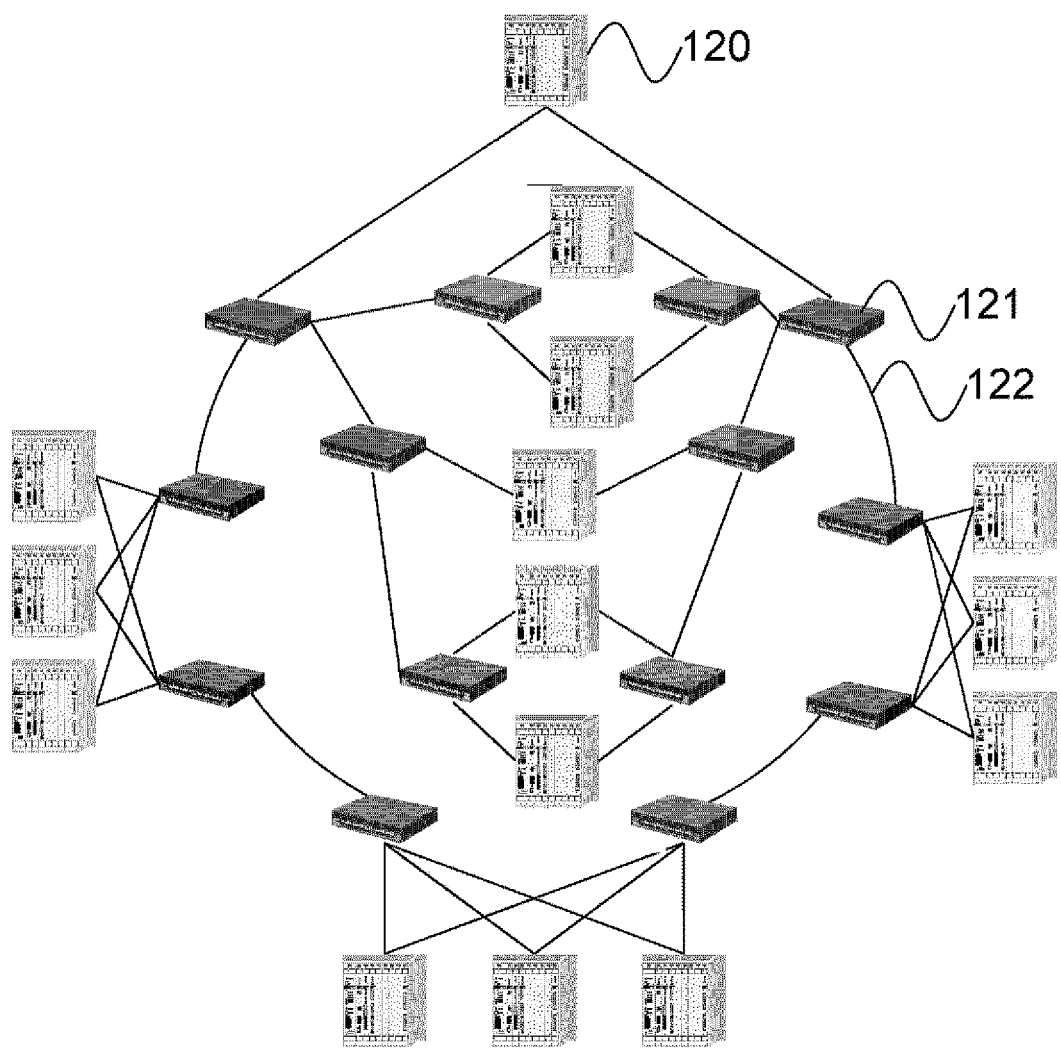
FIG. 25 is a system configuration diagram using one embodiment of the invention.

As another example of layering in topology, as illustrated in FIG. 25, the network relay devices 121 located in other bases may be further connected to each other via the network relay devices 121 and the communication devices 120 so as to be layered. Consequently, a layered structure may be applied to the topology, and thus a system configuration may have a degree of freedom.

The invention is not limited to the above-described Examples and includes various modifications. For example, the above Examples have been described in detail for better understanding of the invention, and are not necessarily limited to including all the configurations described above. Some configurations of certain Example may be replaced with configurations of other Examples, and the configurations of other Examples may be added to the configuration of certain Example. The configurations of other Examples may be added to, deleted from, and replaced with some of the configurations of each Example.

Some or all of the above-described respective configurations, functions, processing units, processing means, and the like may be realized in hardware, for example, through designing thereof using integrated circuits. The above-described respective configurations, functions, and the like may be realized in software by a processor analyzing and executing a program realizing the functions. Information regarding a program, a table, and a file for realizing the respective functions may be stored in a recording device such as a memory, a hard disk, or a solid state drive (SSD), or a recording medium such as an IC card, an SD card, or a DVD.

The illustrated control lines or information lines in the drawings are considered to be necessary for description, and thus it cannot necessarily be said that all control lines or information lines in a product are illustrated. Actually, all constituent elements may be connected to each other.

REFERENCE SIGNS LIST

101 CPU, 102, 180 COMMUNICATION CONTROL SECTION, 103 PHY, 104 MEMORY, 105 NONVOLATILE STORAGE MEDIUM, 106, 134, 135 BUS, 120 COMMUNICATION DEVICE, 121 NETWORK RELAY DEVICE, 122 NETWORK, 130 TRANSMISSION CONTROL UNIT, 131 RECEPTION CONTROL UNIT, 132 TRANSMISSION UNIT, 133 RECEPTION UNIT, 136 MUX, 140 PACKET, 150 SYSTEM IDENTIFIER, 151 SYSTEM IDENTIFIER CONVERSION UNIT, 152 NETWORK RELAY DEVICE SETTING UNIT, 160 COMMUNICATION PATH, 170 SYSTEM ATTRIBUTE DETERMINATION UNIT, 171 CALCULATOR PERFORMANCE DETERMINATION UNIT, 190 COMMUNICATION PORT, 210 POSITION IDENTIFIER, 211 PATH STATE NOTIFICATION UNIT, 212 PATH STATE DETERMINATION UNIT, 220, 221, 222 PATH CONTROL RULE, 230 COMMUNICATION PATH, 240 STATE MESSAGE TRANSMISSION UNIT, 241 STATE DETERMINATION UNIT, 260 HSR TARGET, 261 HSR ET, 262 PATH IDENTIFIER, 263 LSDUsize, 264 SEQUENCE NUMBER

The invention claimed is:

1. A network system comprising:
a plurality of communication devices that transmit and receive packets;
a plurality of relay devices each of which includes a plurality of communication ports and transmits a packet transmitted by the communication device to another communication device; and
a network that connects the plurality of communication devices to the plurality of relay devices in a ring shape,
the plurality of relay devices include a first relay device provided with a plurality of A system communication ports receiving a packet from an A system direction of the ring-shaped network, and a second relay device provided with a plurality of B system communication ports receiving a packet from a B system direction opposite to the A system direction,
the respective A system communication ports of the first relay device are connected to the respective B system communication ports of the second relay device via the communication device,
when a packet is received by the B system communication port, the first relay device selects a transmission destination communication port from among the plurality of A system communication ports according to a predetermined rule, and transmits the received packet to any one of the communication devices by using the selected communication port,
the plurality of communication devices are divided into a plurality of control systems for each group of the communication devices which transmit and receive packets to and from each other so as to monitor or control target equipment,
the plurality of communication devices connected between the first and second relay devices include communication devices belonging to different control systems,
a packet which is transmitted and received by the communication device includes tag information indicating which control system uses the packet, and
the predetermined rule is a rule defining a packet transmission destination communication port according to the tag information.

2. The network system according to claim 1,
the first relay device stores whether each communication port is the A system communication port or the B system communication port, and
the predetermined rule is a rule defining that a packet received by the A system communication port is transmitted from the B system communication port, and a packet received by the B system communication port is transmitted from the A system communication port.

3. The network system according to claim 2,
a packet which is transmitted and received by the communication device includes path information indicating that the packet is transmitted in the A system direction or the B system direction, and
the relay device obtains whether each communication port is the A system communication port or the B system communication port on the basis of path information of a received packet and the communication port having received the packet.

4. A network system comprising:
a plurality of communication devices that transmit and receive packets;
a plurality of relay devices each of which includes a plurality of communication ports and transmits a packet transmitted by the communication device to another communication device; and
a network that connects the plurality of communication devices to the plurality of relay devices in a ring shape,
the plurality of relay devices include a first relay device provided with a plurality of A system communication ports receiving a packet from an A system direction of the ring-shaped network, and a second relay device provided with a plurality of B system communication ports receiving a packet from a B system direction opposite to the A system direction,
the respective A system communication ports of the first relay device are connected to the respective B system communication ports of the second relay device via the communication device,
when a packet is received by the B system communication port, the first relay device selects a transmission destination communication port from among the plurality of A system communication ports according to a predetermined rule, and transmits the received packet to any one of the communication devices by using the selected communication port,
the plurality of communication devices are divided into a plurality of control systems for each group of the communication devices which transmit and receive packets to and from each other so as to monitor or control target equipment,
the plurality of communication devices connected between the first and second relay devices include communication devices belonging to different control systems,
the communication device connected between the first and second relay devices stores information regarding a control system to which the communication device belongs, and group position information defined depending on between which relay devices the communication device is connected, and
when a packet is received from the first relay device, the communication device compares information regarding the control system to which a destination communication device of the packet belongs and the group position information with information regarding the control system to which the communication device belongs and the group position information, so as to control transmission of the packet to the second relay device.

5. The network system according to claim 4,
the communication device connected between the first and second relay devices
receives a packet in a case where information regarding the control system to which a destination communication device of the packet belongs is the same as information regarding the control system of the communication device, and the group position information of the destination communication device of the packet is the same as the group position information of the communication device, and
transmits the packet to the second relay device in a case where the information regarding the control system to which the destination communication device of the packet belongs is the same as the information regarding the control system of the communication device, and the group position information of the destination communication device of the packet is different from the group position information of the communication device.

6. The network system according to claim 1,
the communication device receives state information regarding the network or another communication device from another communication device, and changes the predetermined rule on the basis of the received state information.

7. A network system comprising:
a plurality of communication devices that are disposed in a plurality of bases, and are grouped into predetermined control systems for each of the devices which transmit and receive packets to and from each other so as to monitor or control target equipment; and
a plurality of relay devices each of which includes a plurality of communication ports and transmits a packet transmitted by the communication device to another communication device,
a plurality of communication devices disposed in each base are connected in parallel between two relay devices,
the relay devices disposed in different bases are connected to each other in a ring shape via a network,
a plurality of communication devices disposed in at least one base include communication devices belonging to different control systems,
the communication device connected between the two relay devices stores information regarding a control system to which the communication device belongs, and group position information defined depending on between which relay devices the communication device is connected, and
when a packet is received from a first relay device, the communication device compares information regarding the control system to which a destination communication device of the packet belongs and the group position information with information regarding the control system to which the communication device belongs and the group position information, so as to control transmission of the packet to a second relay device.

8. The network system according to claim 7,
communication paths are provided by using a network which is different from the network formed in a ring shape, between the communication devices or the relay devices disposed in different bases.

9. The network system according to claim 7,
the network is configured by connecting layered networks to each other in a ring shape.

10. A relay device comprising:
three or more A system communication ports receiving a packet from an A system direction of a ring-shaped network, and a B system communication port receiving a packet from a B system direction opposite to the A system direction; and
a communication control unit that selects the communication port as a transmission destination of a packet when the packet is received by any one of the communication ports,
each of the three or more A system communication ports is connected to a communication device which transmits and receives packets, and
when a packet is received by the B system communication port, the communication control device selects a transmission destination communication port from among the three or more A system communication ports according to a predetermined rule, and transmits the received packet to any one of the communication devices by using the selected communication port,
the communication device is connected between the relay device and another relay device and stores information regarding a control system to which the communication device belongs, and group position information defined depending on between which relay devices the communication device is connected, and
when a packet is received from the relay device, the communication device compares information regarding the control system to which a destination communication device of the packet belongs and the group position information with information regarding the control system to which the communication device belongs and the group position information, so as to control transmission of the packet to the another relay device.

\* \* \* \* \*